(12) United States Patent
Taki et al.

(10) Patent No.: US 7,812,707 B2
(45) Date of Patent: Oct. 12, 2010

(54) COMMUNICATION SYSTEM, AND INTERROGATOR AND TRANSPONDER OF THE SYSTEM

(75) Inventors: Kazunari Taki, Nagoya (JP); Tsuyoshi Ohashi, Nagoya (JP); Takuya Nagai, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1056 days.

(21) Appl. No.: 11/149,374

(22) Filed: Jun. 10, 2005

(65) Prior Publication Data

US 2005/0253747 A1 Nov. 17, 2005

Related U.S. Application Data

(63) Continuation-in-part of application No. PCT/JP03/15827, filed on Dec. 11, 2003.

(30) Foreign Application Priority Data

Dec. 13, 2002 (JP) ............................. 2002-361782
Dec. 20, 2002 (JP) ............................. 2002-370673

(51) Int. Cl.
 *G01S 13/74* (2006.01)
(52) U.S. Cl. ..................... 340/10.2; 340/10.1; 342/42
(58) Field of Classification Search ............. 340/10.2, 340/825.49, 569, 10.1, 10.4, 10.3, 572.1, 340/572.3, 825.73; 370/338
See application file for complete search history.

(56) References Cited

U.S. PATENT DOCUMENTS

| 4,296,496 | A | * | 10/1981 | Sadler ........................... 455/1 |
| 5,051,741 | A | * | 9/1991 | Wesby .................... 340/825.49 |
| 5,668,803 | A | * | 9/1997 | Tymes et al. ................. 370/312 |
| 6,480,108 | B2 | * | 11/2002 | McDonald .................. 340/505 |
| 6,657,549 | B1 | * | 12/2003 | Avery ..................... 340/825.49 |
| 2003/0007473 | A1 | * | 1/2003 | Strong et al. ................ 370/338 |
| 2004/0160990 | A1 | * | 8/2004 | Logvinov et al. ........... 370/509 |

FOREIGN PATENT DOCUMENTS

| JP | A 6-68330 | 3/1994 |
| JP | A 8-115392 | 5/1996 |
| JP | B2 2624815 | 4/1997 |
| JP | A 11-298438 | 10/1999 |

* cited by examiner

*Primary Examiner*—Brian A Zimmerman
*Assistant Examiner*—Nabil H Syed
(74) *Attorney, Agent, or Firm*—Oliff & Berridge, PLC

(57) ABSTRACT

A communication system including: (a) a plurality of interrogators; and (b) at least one transponder operable, upon reception of an interrogating wave transmitted from each of the interrogators, to respond to the interrogator with a reflected wave which is generated by modulating the interrogating wave. Each of the interrogators is operable to communicate with the other of the interrogators in a wireless manner. A frequency band of the reflected wave transmitted from the transponder to each of the interrogators is preferably separated from a frequency band of a communication wave transmitted from the interrogator to the other of the interrogators, and is preferably closer to a frequency of the interrogating wave transmitted from the interrogator to the transponder, than the frequency band of the communication wave.

19 Claims, 22 Drawing Sheets

COMMUNICATION SYSTEM, AND INTERROGATOR AND TRANSPONDER OF THE SYSTEM

This is a Continuation-In-Part of Application No. PCT/JP2003/015827 filed Dec. 11, 2003, which claims benefit of Japanese Patent Application No. 2002-361782 filed on Dec. 13, 2002, and Japanese Patent Application No. 2002-370673 filed Dec. 20, 2002. The entire disclosure of the prior applications are here.

BACKGROUND OF THE INVENTION

1. Field of the Invention

The present invention relates to a communication system including a plurality of interrogators and at least one transponder, wherein data transmission is effected between the interrogators and between each of the interrogators and the transponder. The invention also relates to the interrogator and transponder constituting the communication system.

2. Discussion of Related Art

There is known a communication system, as disclosed in JP-H06-68330A (publication of unexamined Japanese Patent Application laid open in 1994), including a plurality of interrogators which are disposed in proximity with each other and connected to each other via wires, and a host computer which is connected to the interrogators via wires so as to control the interrogators. In this communication system, each of the interrogators is arranged to detect and identify a moving body which is brought into proximity with the interrogator. There is also known a communication system, as disclosed in JP-2624815B2 (publication of Japanese Patent issued in 1997), including a plurality of interrogators and transponders, wherein the interrogators are arranged to communicate with the respective transponders by using respective different frequencies, so as to prevent interference of communications which could take place where the communications are simultaneously intended by the plurality of interrogators and transponders.

Further, there are known, as systems commonly used for communication between radio stations, FM (Frequency Modulation) system, AM (Amplitude Modulation) system, FSK (Frequency Shift Keying) and ASK (Amplitude Shift Keying) system. However, in recent years, OFDM (Orthogonal Frequency Division Multiplexing) system is coming into the limelight and put to practical use. This OFDM system is a multicarrier system in which transmission of data is performed with the signal being split into a plurality of sub-signals transmitted simultaneously by respective subcarriers, and is considered to have a high efficiency in utilization of frequency resources. An example of the OFDM system is disclosed in JP-H11-298438A (publication of unexamined Japanese Patent Application laid open in 1999).

However, where the interrogators of the communication system are connected via a wire network, a cumbersome operation is required to establish arrangement of the wiring in the system. The difficulty in the establishment of the wiring arrangement leads to a restriction in positioning of the interrogators and also to a difficulty in increasing the number of the interrogators in the system. Further, the presence of the large number of wires is not preferable for the system also in a sense that it could deteriorate an appearance of the system. For solving such problems, if the communication between the interrogators as well as the communication between the interrogator and transponder is intended in a wireless manner, there would be another problem that the communication between the interrogators and the communication between the interrogator and transponder might interfere with each other. Further, although the OFDM system is put to practical use in the field of high-speed digital communication owing to its high efficiency in utilization of frequency resources, there is still room for improvement in the efficiency of the system as a whole such as sharing of processing means with other systems.

SUMMARY OF THE INVENTION

The present invention was made in the light of the background prior art discussed above. It is therefore a first object of the invention to provide a communication system which has an excellent appearance and an arrangement facilitating change of positions of interrogators and increase of the number of the interrogators in the system. A second object of the invention is to provide an interrogator serving as each of the interrogators of the communication system provided by the first object of the invention. A third aspect of the invention is to provide an interrogator serving as each of interrogators of a communication system which has an arrangement enabling communication between the interrogators as well as communication between each of the interrogators and a transponder to be effected in a wireless manner, without suffering from interference of the communications with each other. A fourth aspect of the invention is to provide a transponder serving as the transponder of the communication system. Each of the first through fourth objects may be achieved by at least one of first through twenty-first aspects of the invention which are described below.

The first aspect of this invention provides a communication system including: (a) a plurality of interrogators; and (b) at least one transponder operable, upon reception of an interrogating wave transmitted from each of the interrogators, to respond to the each of the interrogators with a reflected wave which is generated by modulating the interrogating wave, wherein each of the interrogators is operable to communicate with the other of the interrogators in a wireless manner.

In the communication system constructed according to the first aspect of the invention, the communication among or between the interrogators is effected in a wireless manner. The wireless arrangement facilitates change of positions of the interrogators and increase of the number of the interrogators in the system, and also enables the system to have an excellent appearance.

According to the second aspect of the invention, in the communication system defined in the first aspect of the invention, each of the interrogators is operable to transmit the interrogating wave for interrogating the at least one transponder, and to transmit a communication wave for communicating with the other of the interrogators. The transponder is operable, upon reception of the interrogating wave transmitted from each of the interrogators, to transmit the reflected wave for responding to the each of the interrogator. A frequency band of the reflected wave transmitted from the transponder to the each of the interrogators is separated from a frequency band of the communication wave transmitted from the each of the interrogators to the other of the interrogators, and is closer to a frequency of the interrogating wave transmitted from the each of the interrogators to the at least one transponder, than the frequency band of the communication wave.

The communication system according to the second aspect of the invention provides, in addition to the above-described advantages provided by the system according to the first aspect of the invention, an advantage that the reflected wave and the communication wave are prevented from interfering with each other, owing to an arrangement in which the frequency band of the reflected wave transmitted from the transponder is separated from the frequency band of the communication wave used for the communication between the interrogators. Further, in the communication system of the second aspect of the invention, it is possible to reduce an electric power consumed by the transponder, owing to an arrangement in which the frequency band of the reflected wave is closer to the frequency of the interrogating wave, than the frequency band of the communication wave. It is noted that the term "communication wave" used in the present specification refers to a wave used for the communication between or among the interrogators of the communication system, unless otherwise specified.

According to the third aspect of the invention, in the communication system defined in the second aspect of the invention, one of upper and lower limit values defining the frequency band of the communication wave transmitted from the each of the interrogators is closer to the frequency of the interrogating wave transmitted from the each of the interrogators, than the other of the upper and lower limit values, and is different from the frequency of the interrogating wave transmitted from the each of the interrogators, by a first difference value, while one of upper and lower limit values defining the frequency band of the reflected wave transmitted to respond to the each of the interrogators is more distant from the frequency of the interrogating wave transmitted from the each of the interrogators, than the other of the upper and lower limit values, and is different from the frequency of the interrogating wave transmitted from the each of the interrogators, by a second difference value, such that the first difference value is at least substantially twice as large as the second difference value.

The communication system according to the third aspect of the invention provides an additional advantage that, even where the communication wave used for the communication between the interrogators is reflected by the transponder, the reflected wave generated in response to the interrogating wave is not likely to overlap in frequency band with a reflected wave generated in response to the communication wave, owing to an arrangement in which the above-described first value is at least substantially twice as large as the above-described second value. That is, this arrangement is effective to restrain interference of each of the interrogators and the transponder with each other, and to accordingly increase reliability of the communication effected in the system, whereby the communication between each interrogator and the transponder and the communication between the interrogators can be simultaneously effected without deteriorating the efficiency in utilization of frequency resources.

According to the fourth aspect of the invention, in the communication system defined in the second or third aspect of the invention, one of upper and lower limit values defining the frequency band of the reflected wave transmitted to respond to the each of the interrogators is more distant from the frequency of the interrogating wave transmitted from the each of the interrogators, than the other of the upper and lower limit values, and is different from the frequency of the interrogating wave transmitted from the each of the interrogators, by a second difference value. The frequency of the interrogating wave transmitted from the each of the interrogators is different from the frequency of the interrogating wave transmitted from one of the interrogators that is adjacent to the each of the interrogators, by a third difference value, while upper and lower limit values defining the frequency band of the communication wave transmitted from the each of the interrogators are different from each other by a fourth difference value, such that the third difference value is substantially equal to or larger than a sum of the fourth difference value and four times of the second difference value, namely, such that the following expression is satisfied.

(3rd difference value)≧(4th difference value)+4×(2nd difference value)

The communication system according to the fourth aspect of the invention provides an additional advantage that the reflected wave transmitted from the transponder in response to the interrogating wave, the reflected wave transmitted from the transponder in response to the communication wave and the communication wave can be prevented from interfering with one another, whereby the reliability of the communication effected in the system is increased. Further, where the above-described third difference value is made substantially equal to the above-described sum of the fourth difference value and four times of the second difference value, it is possible to maximize the efficiency of utilization of the frequency resources by the interrogators.

According to the fifth aspect of the invention, in the communication system defined in any one of the first through fourth aspects of the invention, each of the interrogators is operable to transmit the interrogating wave for interrogating the at least one transponder, and to transmit communication waves having the same information, for communicating with at least two of the interrogators which are adjacent to the each of the interrogators, such that frequency bands of the respective communication waves transmitted by the each of the interrogators lie on opposite sides of a frequency of the interrogating wave transmitted by the each of the interrogators.

The communication system according to the fifth aspect of the invention provides an additional advantage that the information can be transmitted from each of the interrogators to two or more interrogators adjacent to the each of the interrogators, without switching channel for the transmission of the information. That is, owing to an arrangement in which the frequency bands of the respective communication waves representative of the same information lie on the opposite sides of the frequency of the interrogating wave, the information can be simultaneously transmitted from each interrogator to the two or more adjacent interrogators, whereby the communication between the interrogators can be made with high efficiency.

According to the sixth aspect of the invention, in the communication system defined in any one of the first through fifth aspects of the invention, each of the interrogators is operable to transmit a communication wave for communicating with the other of the interrogators, wherein the communication wave is a wave modulated by an orthogonal frequency division multiplexing (OFDM) system.

The communication system according to the sixth aspect of the invention provides an additional advantage that, owing to an arrangement in which the communication wave is a wave modulated by the OFDM system, the frequency resources can be more efficiently utilized, than in an arrangement in which a single carrier wave is used in the modulation.

According to the seventh aspect of the invention, in the communication system defined in the sixth aspect of the invention, each of the interrogators includes: (a-1) an OFDM signal generator operable to generate an OFDM signal; (a-2) a mixer operable to obtain the communication wave, by upconverting the generated OFDM signal with a main carrier wave; (a-3) a combiner operable to obtain a transmitting wave, by combining the obtained communication wave with the interrogating wave constituted by the main carrier wave which is modulated or not modulated; (a-4) a detector operable to detect a received wave which has been received by the each of the interrogators; (a-5) an A/D converter operable to convert the detected wave into a digital signal; (a-6) a separator operable to separate the detected wave which has been converted into the digital signal, into a component of the reflected wave and a component of the communication wave which has been transmitted from the other of the interrogators; (a-7) a reflected-wave demodulator operable to demodulate the component of the reflected wave which has been separated from the component of the communication wave; and (a-8) a communication-wave demodulator operable to demodulate the component of the communication wave which has been separated from the component of the reflected wave.

The communication system according to the seventh aspect of the invention provides additional advantages that the transmission of the interrogating wave and the transmission of the communication wave can be made concurrently with each other, and that the reception of the reflected wave and the reception of the communication wave can be made concurrently with each other, owing to an arrangement in which the reflected wave and the communication wave are demodulated after the separation of the reflected wave and the communication wave from each other.

According to the eighth aspect of the invention, in the communication system defined in the seventh aspect of the invention, each of the interrogators further includes a Fourier transformer, wherein the reflected-wave demodulator and the communication-wave demodulator share the Fourier transformer with each other.

The communication system according to the eighth aspect of the invention provides additional advantages that the demodulations of the reflected wave and the communication wave can be made efficiently owing to the Fourier transformer, and that the construction of each interrogator can be simplified owing to an arrangement in which the Fourier transformer is shared by the reflected-wave demodulator and the communication-wave demodulator.

The ninth aspect of the invention provides an interrogator for use in the communication system defined in any one of the first through eighth aspects of the invention.

The interrogator according to the ninth aspect of the invention may be provided with any constructional features recited in the first through eighth aspects of the invention. In other words, the interrogator of the ninth aspect of the invention may be interpreted to correspond to each of the interrogators defined in any one of the first through eighth aspects of the invention.

The tenth aspect of the invention provides an interrogator constituting each of a plurality of interrogators which cooperate with at least one transponder to constitute a communication system, in which each of the interrogators is operable to transmit a main carrier wave to the transponder and to transmit a communication wave to the other of the interrogators, while the transponder is operable, upon receipt of the main carrier wave transmitted from the each of the interrogators, to respond with a reflected wave generated by modulating the main carrier wave with a response data signal. The interrogating of the tenth aspect of the invention includes: (a) a transmission data signal generator operable to generate a transmission data signal based on information that is to be transmitted to the other of the interrogators, such that a frequency band of the generated transmission data signal is different from a frequency of the response data signal; (b) a main carrier modulator operable to generate a transmission-data-signal modulated wave, by modulating the main carrier wave with the transmission data signal which has been supplied from the transmission data signal generator; (c) a transmitter operable to transmit the communication wave containing the main carrier wave and the transmission-data-signal modulated wave which have been supplied from the main carrier modulator; and (d) a receiver operable to receive the reflected wave and the communication wave which have been transmitted from the transponder and the other of the interrogators, respectively.

In the interrogator constructed according to the tenth aspect of the invention, the transmission data signal is generated such that its frequency band is different from the frequency band of the response data signal with which the main carrier wave is modulated by the transponder, so that the communication between the interrogators and the communication between each interrogator and the transponder are prevented from interfering with each other, whereby the former and latter communications can be effected concurrently with each other. Further, since the transmission data signal (that is transmitted from the interrogator to the other interrogator) is modulated with the main carrier wave (that is transmitted from the interrogator to the transponder), the interrogator can be advantageously given a simplified construction.

According to the eleventh aspect of the invention, in the interrogator defined in the tenth aspect of the invention, the transmission data signal generator generates the transmission data signal such that a frequency of the transmission data signal is higher than a frequency of the response data signal.

The interrogator according to the eleventh aspect of the invention provides, in addition to the above-described advantages provided by the interrogator according to the tenth aspect of the invention, an advantage that an electric power consumed by the transponder can be made smaller, than where the frequency of the transmission data signal is lower than the frequency of the response data signal, because the frequency of the response data signal can be made small.

According to the twelfth aspect of the invention, the interrogator defined in the tenth or eleventh aspect of the invention further includes: (e) a received wave demodulator operable to demodulate the waves which have been received by the receiver, with an output supplied from the main carrier modulator; (f) a first filter operable to pass the response data signal among an output supplied from the received wave demodulator; and (g) a second filter operable to pass the transmission data signal among the output supplied from the received wave demodulator.

The interrogator according to the twelfth aspect of the invention provides additional advantages that makes it possible to extract the transmission-data-signal modulated wave and the reflected wave transmitted from the other interrogator and the transponder, respectively, for obtaining information contained in the extracted waves, owing to the provision of the first and second filters.

The thirteenth aspect of the invention provides a transponder constituting each of at least one transponder which cooperates with a plurality of interrogators each provided by the interrogator defined in any one of the tenth through twelfth aspects of the invention, to constitute a communication system. The transponder includes: (a) a response data signal generator operable to generate a response data signal based on information that is to be transmitted to the interrogators, such that a frequency band of the generated response data signal is different from the frequency band of the transmission data signal; and (b) a main carrier reflector operable to modulate the main carrier wave transmitted from each of the interrogators, with the generated response data signal, and to respond to the each of the interrogators with a reflected wave which is provided by the modulated main carrier wave, wherein the response data signal generator generates the response data signal such that a frequency band of the response data signal is lower than a frequency band of the transmission data signal.

In the transponder of the thirteenth aspect of the invention in which the frequency of the response data signal is lower than the frequency of the transmission data signal, an electric power consumed by the transponder can be advantageously made smaller, than where the frequency of the response data signal is higher than the frequency of the transmission data signal, because the frequency of the response data signal can be made small. Further, where the present transponder is newly installed in a backscatter system which has been already in operation, the operation of the system can be resumed, by simply tuning the newly installed transponder, without changing the setting of each interrogator.

The fourteenth aspect of the invention provides an interrogator providing each of a plurality of interrogators which cooperate with at least one transponder to constitute a communication system, in which each of the interrogators is operable to transmit a main carrier wave to the transponder and to transmit a communication wave to the other of the interrogators, while the transponder is operable, upon receipt of the main carrier wave transmitted from the each of the interrogators, to respond with a reflected wave generated by modulating the main carrier wave with a response data signal. The interrogator includes: (a) a transmission data signal generator operable to generate a transmission data signal based on information that is to be transmitted to the other of the interrogators; (b) a main carrier modulator operable to generate a transmission-data-signal modulated wave, by modulating the main carrier wave with the transmission data signal which has been supplied from the transmission data signal generator, and to output the main carrier and the generated transmission-data-signal modulated wave having components whose respective frequency bands lie on opposite sides of a frequency of the main carrier wave; (c) a filter operable to pass, among an output supplied from the main carrier modulator, the main carrier wave and one of the components of the transmission-data-signal modulated wave, and to reject the other of the components of the transmission-data-signal modulated wave; (d) a transmitter operable to transmit the communication wave containing the main carrier wave and the one of the components of the generated modulated wave, which have been supplied from the filter; and (e) a receiver operable to receive the reflected wave and the communication wave which have been transmitted from the transponder and the other of the interrogators, respectively.

In the interrogator constructed according to the fourteenth aspect of the invention, the transmission of the interrogating wave and the transmission of the communication wave can be made concurrently with each other, owing to the provision of the filter operable to pass the main carrier wave and the above-described one of the components of the transmission-data-signal modulated wave, among the output supplied from the main carrier demodulator. Further, since the transmission data signal (that is transmitted from the interrogator to the other interrogator) is modulated with the main carrier wave (that is transmitted from the interrogator to the transponder), the interrogator can be advantageously given a simplified construction.

According to the fifteenth aspect of the invention, the interrogator defined in the fourteenth aspect of the invention further includes: (f) a first reception filter operable to pass, among the waves received by the receiver, the reflected wave which has been transmitted from the transponder; and (g) a second reception filter operable to pass, among the waves received by the receiver, the communication wave which has been transmitted from the other of the interrogators.

The interrogator according to the fifteenth aspect of the invention provides an additional advantage that, even where the communication wave transmitted from the other interrogator and the reflected wave transmitted from the transponder are simultaneously received by the interrogator, the communication wave and the reflected wave can be separated from each other owing to the provision of the first and second reception filters, whereby information contained in each of the communication and reflected waves can be accurately obtained.

According to the sixteenth aspect of the invention, the interrogator defined in the fourteenth or fifteenth aspect of the invention further includes a main carrier generator operable to generate the main carrier wave such that the main carrier wave has such an intensity that prevents the reflected wave transmitted from the transponder, from interfering with the communication wave transmitted from the other of the interrogators.

In the interrogator of the sixteenth aspect of the invention in which the intensity of the main carrier wave is set to such a value that prevents the communication wave from being interfered by the reflected wave, there is provided an additional advantage that the frequency band of the transmission data signal and the frequency band of the response data signal can be set to overlap with each other, thereby making it possible to reduce the frequencies of the respective transmission and response data signals, leading to a reduction in the electric power consumed by the interrogator and the transponder.

According to the seventeenth aspect of the invention, in the interrogator defined in the tenth through sixteenth aspects of the invention, the communication wave reception determiner is provided to determine whether or not the communication wave transmitted from the other of the interrogators is being received by the receiver. The transmitter is arranged to suspend transmission of the communication wave to the other of the interrogators while the communication wave reception determiner determines that the communication wave transmitted from the other of the interrogators is being received by the receiver.

The interrogator of the seventeenth aspect of the invention provides an additional advantage that the communication wave transmitted from the interrogator and the communication wave transmitted from the other interrogator (i.e., communication wave received by the interrogator) are prevented from interfering with each other, owing to an arrangement in which the transmitter is arranged to suspend transmission of the communication wave to the other interrogator while the communication wave transmitted from the other interrogator is being received by the receiver. It is therefore possible to increase reliability of the communication effected in the system.

According to the eighteenth aspect of the invention, the communication system defined in any one of the first through eighth aspects of the invention further includes an administrative server, wherein at least one of the interrogators is connected to the administrative server via a communication line, such that a data communication can be effected between the at least one of the interrogators and the administrative server.

In the communication system of the eighteenth aspect of the invention, there is provided an additional advantage that data sent from the above-described at least one of the interrogators connected to the communication line can be supervised or administrated by the administrative server, whereby the communication system including the interrogator or interrogators connected to the communication line can be administrated in a unified manner.

According to the nineteenth aspect of the invention, in the communication system defined in the eighteenth aspect of the invention, each of the at least one of the interrogators connected to the administrative server includes a communication data transmitter operable to transmit data related to communication between the interrogators and data related to communication between each of the interrogators and the transponder, to the administrative server via the communication line. The administrative server includes a communication data administration portion operable to administrate, in a unified manner, a set of data transmitted from the at least one of the interrogators.

For example, the communication system of the nineteenth aspect of the invention may be constituted by a plurality of sub-systems each including the interrogators and the at least one transponder, such that the set of data is transmittable from the above-described at least one of the interrogators of each of the sub-systems to the administrative server, whereby the plurality of sub-systems of the communication system can be supervised or administrated in a unified manner by the administrative server.

According to the twentieth aspect of the invention, in the communication system defined in the eighteenth or nineteenth aspect of the invention, each of the at least one of the interrogators connected to the administrative server includes: (i) a communication data collector operable to collect data related to communication between the interrogators and data related to communication between each of the interrogators and the transponder, by sequentially interrogating the other of the interrogators adjacent to the each of the at least one of the interrogators; and (ii) a communication data transmitter operable to transmit a set of data collected by the communication data collector, to the administrative server via the communication line.

The communication system of the twentieth aspect of the invention provides an additional advantage that the set of data related to the communication effected in the communication system can be efficiently collected by the above-described at least one of the interrogators connected to the communication line.

According to the twenty-first aspect of the invention, in the communication system defined in the nineteenth or twentieth aspect of the invention, the interrogators are placed in each of a plurality of stores, wherein the set of data transmitted from the at least one of the interrogators include data related to each of the plurality of stores in which the interrogators are placed.

In the communication system of the twentieth-first aspect of the invention, it is possible to efficiently administrate the data related to each of the stores in which the interrogators are disposed. It is noted that this communication system may be constituted by a plurality of sub-systems, each of which includes the interrogators and the at least one transponder, and which are installed in the respective stores, such that the data related to each of the stores is transmittable from the above-described at least one of the interrogators of each of the sub-systems to the administrative server, whereby the plurality of stores can be supervised or administrated in a unified manner by the administrative server.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

There will be described in detail some embodiments of this invention, referring to the accompanying drawings.

First Embodiment

Figure 1:
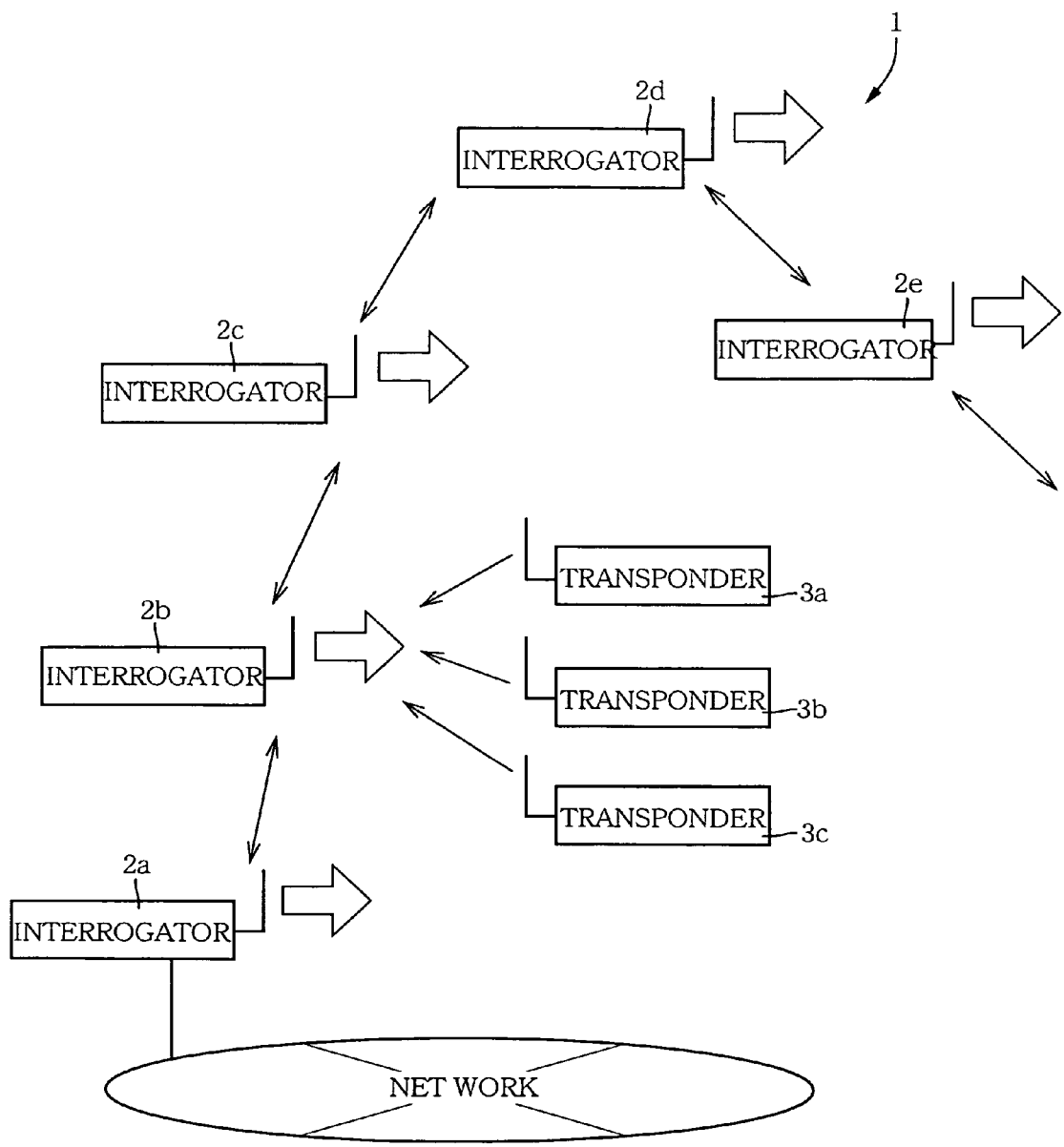
FIG. 1 is a view showing an arrangement of a communication system constructed according to a first embodiment of this invention.

Referring first to FIG. 1, there is shown a communication system 1 constructed according to a first embodiment of this invention. This communication system 1 includes five interrogators 2a, 2b, 2c, 2d, 2e (which will be referred simply to as interrogators 2 where they do not have to be distinguished from each other) and three transponders 3a, 3b, 3c (which will be referred simply to as transponders 3 where they do not have to be distinguished from each other). The interrogator 2a, which is one of the five interrogators 2a-2e, is connected to a network, and has a function of carrying out various service procedures. The interrogator 2a is operable to transmit data (e.g., command signal) directed to at least one of the other interrogators 2b-2e via the interrogator or interrogators 2 adjacent to the interrogator 2a, and to receive data (e.g., response data) obtained by at least one of the other interrogators 2b-2e via the adjacent interrogator or interrogators 2, so that the received data is subjected to the service procedures carried out by the interrogator 2a. Although the communication system 1 shown in FIG. 1 includes the five interrogators 2a-2e and the three transponders 3a-3c, the numbers of them may be changed depending upon scale of the communication system and service environment. Further, the service procedures may be carried out by a device (not shown) provided in the network, rather than by the interrogator 2a, so that the data is subjected to the service procedures after being sent to the device from the interrogator 2a. In this case, the interrogator 2a does not have to have the function of carrying out the service procedures. It is noted that the service procedures will be described later in a fourth embodiment of the invention.

Each of the interrogators 2a-2e is operable to transmit an interrogating wave which is produced by modulating a main carrier wave with predetermined information, toward a selected one or ones of the transponders 3a-3c. Each of the transponders 3a-3c operable, upon reception of the interrogating wave transmitted from one of the interrogators 2a-2e, to respond to the interrogator 2 with a reflected wave (i.e., response wave) which is produced by modulating the interrogating wave with predetermined information such as identification data or number (transponder ID) which is given to the transponder 3 to represent its identification. Further, each of the interrogators 2a-2e is operable to transmits also a communication wave toward a selected one or ones of the other interrogators 2. Thus, the communication between the interrogators 2 and the transponders 3 and the communication between the interrogators 2 are both effected in a wireless manner. It is noted that the communication wave transmitted and received in the communication between the interrogators 2 contains transmission information such as identification data or number (interrogator ID) representative of an identification of the interrogator 2 transmitting the communication wave, the transponder ID received by the interrogator 2 directly from the transponder 3 or indirectly via another interrogator 2, and the interrogator ID of the another interrogator 2 which has received the transponder ID. It is also noted that each interrogator 2 may transmit, as the interrogating wave, the main carrier wave without modulation thereto.

There will be described electric arrangements of the interrogators 2a-2e and the transponders 3a-3c, by reference to the drawings.

Figure 2:
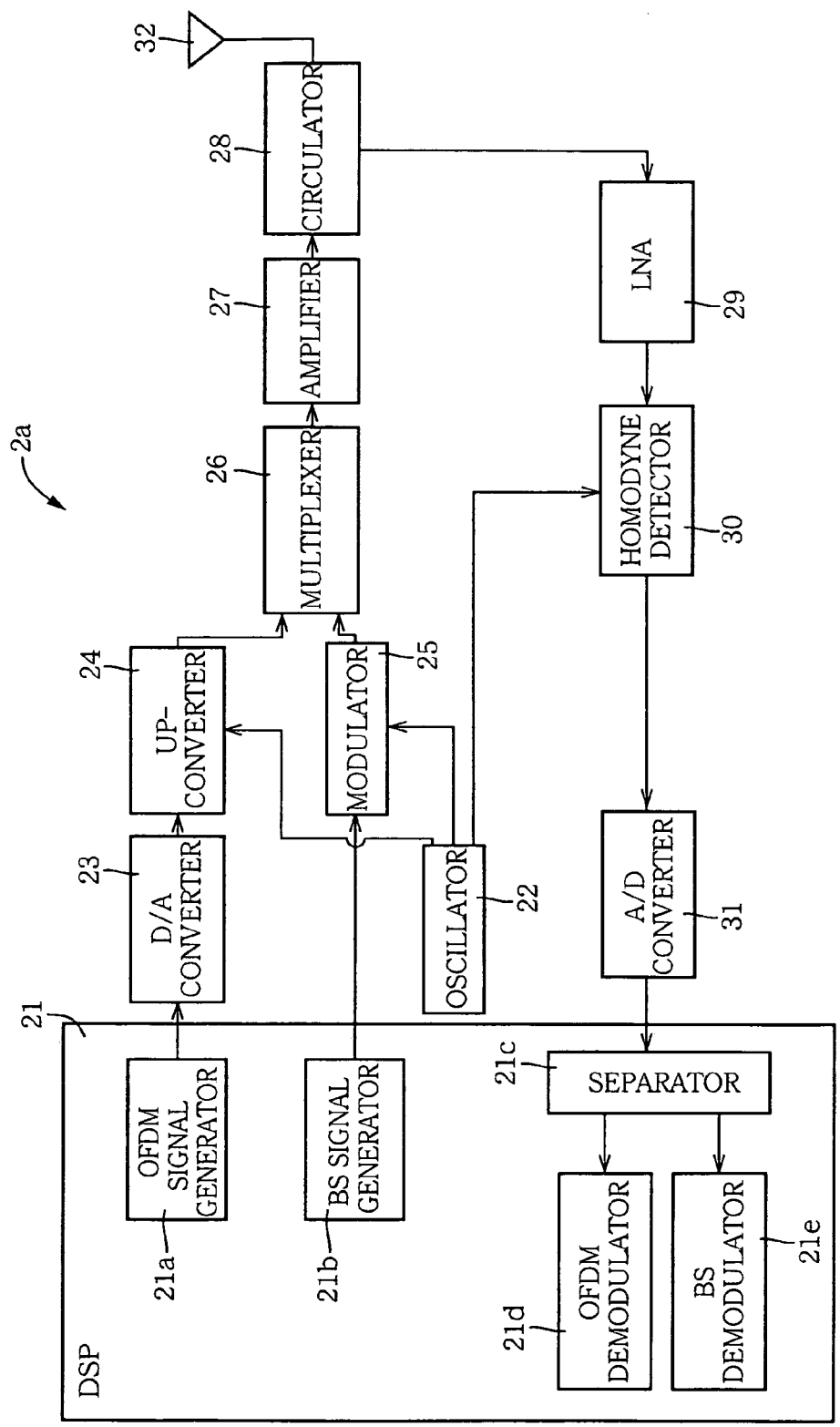
FIG. 2 is a block diagram showing an arrangement of an interrogator included in the communication system of FIG. 1.

Referring to the block diagram of FIG. 2, the arrangement of the interrogator 2a will be first described. It is noted that the other interrogators 2b-2e are identical in construction with the interrogator 2a, and the following description as to the interrogator 2a can be applied to the interrogators 2b-2e.

As shown in FIG. 2, the interrogator 2a includes a digital signal processor (DSP) 21, an oscillator 22, a D/A converter 23, an up-converter 24, a modulator 25, a multiplexer 26, an amplifier 27, a circulator 28, a low noise amplifier (LNA) 29, a homodyne detector 30, an A/D converter 31 and an antenna 32. In the present first embodiment, the DSP 21 includes an OFDM signal generator 21a, a BS signal generator 21b, a separator 21c, an OFDM demodulator 21d and a BS demodulator 21e.

The OFDM signal generator 21a of the DSP 21 is operable to generate an OFDM signal. Described more specifically, the OFDM signal generator 21a produces the OFDM signal with information transmitted from the transponder 3a-3c or the other interrogator 2b-2e, through an OFDM (orthogonal frequency division multiplexing) modulation system, and then outputs the thus produced OFDM signal to the D/A converter 23. By means of this OFDM modulation system using a plurality of carriers having respective different frequencies, the plurality of carriers are adapted to have the frequencies $fs1, fs2, \ldots, fsn$ ($fs1 < fs2 < \ldots < fsn$) in the present first embodiment. It is noted that the carriers of the OFDM signal produced by the OFDM signal generator 21a of each of the other interrogators 2b-2e have the same frequencies $fs1, fs2 \ldots, fsn$ ($fs1 < fs2 < \ldots < fsn$) as those of the OFDM signal produced by the OFDM signal generator 21a of the interrogator 2a in the present first embodiment. However, the interrogators 2a-2e may be different from one another with respect to the frequencies of the carriers of the OFDM signal.

The BS signal generator 21b of the DSP 21 is operable to generate a BS (back scatter) signal. That is, the BS signal generator 21b produces the BS signal containing the ID number of the interrogator 2a and information representative of hopping timing or hopping pattern of a subcarrier of the transponder 3, and then outputs the produced BS signal to the modulator 25.

The separator 21c of the DSP 21 is operable to separate a received wave which has been received by the antenna 32 and then converted into a digital signal by the A/D converter 31, into a component of the reflected wave transmitted from the transponder 3 in response to the interrogating wave, and a component of the communication wave transmitted from the other interrogator 2. That is, the separator 21c separates the digital signal into a signal corresponding to the communication wave transmitted from the adjacent interrogator 2, and a signal corresponding to the response wave transmitted from the transponder 3, and then outputs the signal corresponding to the communication wave and the signal corresponding to the response wave, to the OFDM demodulator 21d and the BS demodulator 21e, respectively. The OFDM demodulator 21d serves as a communication-wave demodulator operable to demodulate the signal corresponding to the communication wave transmitted from the other interrogator 2, so as to obtain information contained in the communication wave. The BS demodulator 21e serves as a reflected-wave demodulator operable to demodulate the signal corresponding to the reflected wave transmitted from the transponder 3, so as to obtain information contained in the reflected wave.

The oscillator 22 is operable to generate a main carrier having a suitable frequency such as 900 MHz, 2.4 GHz or 5 GHz, and then output the generated main carrier to the up-converter 24, modulator 25 and homodyne detector 30. It is noted that the frequencies of the main carriers generated by the oscillators 22 of the respective interrogators 2a, 2b, 2c, 2d and 2e are different from each other, and are referred to as fca, fcb, fcc, fcd and fce, respectively.

The D/A converter 23 is operable to convert the OFDM signal as a digital signal inputted from the OFDM signal generator 21a of the DSP 21, into an analog signal, and then output the OFDM signal to the up-converter 24. The up-converter 24 serves as a mixer operable to obtain the communication wave, by upconverting the OFDM signal with the main carrier wave generated by the oscillator 22, and then output the communication wave to the multiplexer 26.

As shown in FIG. 5, the signals outputted from the up-converter 24 of the interrogator 2a are given frequencies fca−fsn, . . . , fca−fs2, fca−fs1, fca+fs1, fca+fs2, . . . , fca+fsn (among which the frequencies fca−fsn, . . . , fca−fs2, fca−fs1 are not shown in FIG. 5). The signals outputted from the up-converter 24 of the interrogator 2b are given frequencies fcb−fsn, . . . , fcb−fs2, fcb−fs1, fcb+fs1, fcb+fs2, . . . , fcb+fsn. The signals outputted from the up-converter 24 of the interrogator 2c are given frequencies fcc−fsn, . . . , fcc−fs2, fcc−fs1, fcc+fs1, fcc+fs2, . . . , fcc+fsn. The signals outputted from the up-converter 24 of the interrogator 2d are given frequencies fcd−fsn, . . . , fcd−fs2, fcd−fs1, fcd+fs1, fcd+fs2, . . . , fcd+fsn. The signals outputted from the up-converter 24 of the interrogator 2e are given frequencies fce−fsn, . . . , fce−fs2, fce−fs1, fce+fs1, fce+fs2, . . . , fce+fsn.

The modulator 25 serves as a BS signal modulator to modulate amplitude of the main carrier with the BS signal as the interrogating wave inputted from the BS signal generator 21b of the DSP 21. That is, the modulator 25 is operable to modulate the interrogating signal in the form of the BS signal, by means of amplitude modulation (amplitude shift keying: ASK), so as to modulate the main carrier wave inputted from the oscillator 22. The interrogating wave, as well as the communication wave, is outputted to the multiplexer 26.

The multiplexer 26 serves as a combiner to combine the above-described communication wave and interrogating wave, namely, combine the signals outputted from the up-converter 24 and the modulator 25, and then output the composite signal to the amplifier 27. The amplifier 27 electrically amplifies the composite signal outputted from the multiplexer 26, and then outputs the amplified signal to the circulator 28. The circulator 28 supplies the signal inputted from the amplifier 27 and the wave received by the antenna 32, to the antenna 32 and the LNA 29, respectively, so as to separate the output signal and the input signal from each other. The signal outputted to the antenna 32 via the circulator 28 is radiated as a wave through the antenna 32 to the air.

The wave, which is supplied to the antenna 32 from the OFDM signal generator 21a of the DSP 21 via the D/A converter 23, up-converter 24, multiplexer 26, amplifier 27 and circulator 28 so as to be eventually radiated from the antenna 32, is the communication wave used for the communication between the interrogators 2. On the other hand, the wave, which is supplied to the antenna 32 from the BS signal generator 21b of the DSP 21 via the modulator 25, multiplexer 26, amplifier 27 and circulator 28 so as to be eventually radiated from the antenna 32, is the interrogating wave transmitted from the interrogator 2a to the transponders 3a-3c, for the communication between the interrogator 2a and the transponders 3a-3c.

As is apparent from the above description, the communication waves transmitted from each interrogator to the adjacent interrogators are given respective frequency bands which lie on respective opposite sides of the frequency of the interrogating wave emitted from the interrogator in question.

Specifically described, the frequency bands of the communication waves emitted from the interrogator 2a consist of one ranging from frequency fca−fsn to frequency fca−fs1 and the other ranging from frequency fca+fs1 to frequency fca+fsn, while the frequency of the interrogating wave emitted from the interrogator 2a is fca. The frequency bands of the communication waves emitted from the interrogator 2b consist of one ranging from frequency fcb−fsn to frequency fcb−fs1 and the other ranging from frequency fcb+fs1 to frequency fcb+fsn, while the frequency of the interrogating wave emitted from the interrogator 2b is fcb. The frequency bands of the communication waves emitted from the interrogator 2c consist of one ranging from frequency fcc−fsn to frequency fcc−fs1 and the other ranging from frequency fcc+fs1 to frequency fcc+fsn, while the frequency of the interrogating wave emitted from the interrogator 2c is fcc. The frequency bands of the communication waves emitted from the interrogator 2d consist of one ranging from frequency fcd−fsn to frequency fcd−fs1 and the other ranging from frequency fcd+fs1 to frequency fcd+fsn, while the frequency of the interrogating wave emitted from the interrogator 2d is fcd. The frequency bands of the communication waves emitted from the interrogator 2e consist of one ranging from frequency fce−fsn to frequency fce−fs1 and the other ranging from frequency fce+fs1 to frequency fce+fsn, while the frequency of the interrogating wave emitted from the interrogator 2e is fce.

The LNA 29 is arranged to amplify the signal which has been received by the antenna 32 from the interrogator 2 or transponder 3 and then inputted from the circulator 28 thereto, and to then output the amplified signal to the homodyne detector 30. The homodyne detector 30 is arranged to mix the amplified signal inputted from the LNA 29, with the main carrier wave inputted from the oscillator 22, thereby effecting homodyne detection of the signal. An output of the homodyne detector 30 is outputted to the A/D converter 31, which in turn converts the analog signal inputted from the homodyne detector 30, into a digital signal. The digital signal as an output of the A/D converter 31 is outputted to the separator 21c.

When the antenna 32 of the interrogator 2a receives the communication wave transmitted from the adjacent interrogator 2, the received communication wave is outputted to the OFDM demodulator 21d of the DSP 21 via the circulator 28, LNA 29, homodyne detector 30, A/D converter 31 and separator 21c of the DSP 21, so that the communication wave is demodulated by the OFDM demodulator 21d of the DSP 21. When the antenna 32 of the interrogator 2a receives the response wave transmitted from one of the transponders 3a-3c, the received response wave is outputted to the BS demodulator 21e of the DSP 21 via the circulator 28, LNA 29, homodyne detector 30, A/D converter 31 and separator 21c of the DSP 21, so that the response wave is demodulated by the BS demodulator 21e of the DSP 21. The homodyne detector 30 serves to detect the communication or response wave received by the interrogator 2a. The A/D converter 31 serves to convert the received wave into the digital signal.

Referring to the block diagram of FIG. 3, the separator 21c, OFDM demodulator 21d and BS demodulator 21e included in the DSP 21 of FIG. 2 will be described by way of example.

Figure 3:
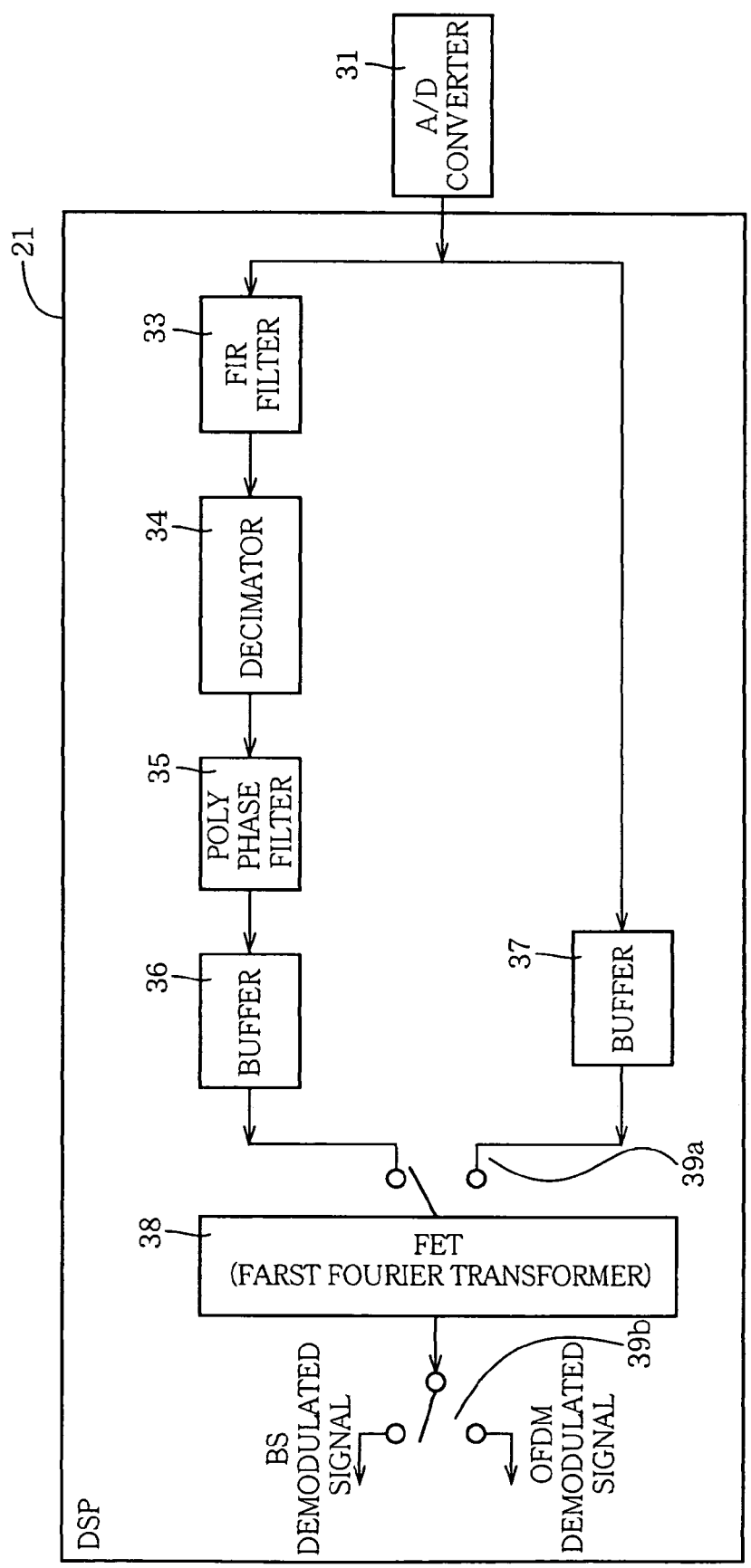
FIG. 3 is a block diagram showing a part of DSP (digital signal processor) included in the interrogator of FIG. 2.

As shown in FIG. 3, the separator 21c, OFDM demodulator 21d and BS demodulator 21e are constituted by a FIR filter 33, a decimator 34, a poly phase filter 35, buffers 36, 37, FFT block 38 and switches 39a, 39b.

An output of the A/D converter 31 is inputted to the FIR (finite impulse response) filter 33 and also to the buffer 37, so that a value of the output of the A/D converter 31 is directly stored. The buffer 37 and the FFT block 38 are connected through the switch 39a, as needed, whereby a signal representative of the value stored in the buffer 37 is inputted to the FFT block 38.

The FIR filter 33 removes the communication wave from the output of the A/D converter 31 inputted to the FIR filter 33. The decimator 34 reduces a sampling rate applied to the output, which is then stored in the buffer 36 after having passed through the poly phase filter 35 used for a filterbank. The signal stored in the buffer 36 is outputted to the FFT block 38, as needed, through the switch 39a which is operable to connect the buffer 36 and the FFT block 38.

The FFT (Fast Fourier Transformer) block 38 transforms the data supplied from the buffer 37 (i.e., a signal which is function of time and is therefore represented in a time domain), into a signal (which is function of frequency and is therefore represented in a frequency domain), by means of Fast Fourier Transform, so as to obtain an OFDM demodulated signal. The thus obtained OFDM demodulated signal is outputted to a signal processor (not shown) included in the DSP 21 via the switch 39b, so as to be analyzed in the signal processor. As shown in FIG. 5, each of the transponders 3 is arranged to respond to the interrogator 2b, by using subcarriers having frequencies fl–fh within the frequency band Ba or Bb. In this instance, the frequency of each of the subcarriers is hopped, whereby frequency bands of the reflected wave (one of which ranges from frequency fcb–fh to frequency fcb–fl and the other of which ranges from frequency fcb+fl to frequency fcb+fh) are hopped.

Further, the FFT block 38 transforms the data supplied from the buffer 36, so as to cooperate with the poly phase filter 35 to constitute a filter bank, so that a BS demodulated signal is obtained concurrently with the hopping frequency of each subcarrier. The BS demodulated signal is supplied to the signal processor (not shown) of the DSP 21 via the switch 39b, so as to be analyzed in the signal processor.

The BS demodulated signal, which has been analyzed in the signal processor, is appropriately separated into frames, and the frames are then sorted into a plurality of groups corresponding to the respective transponders 3. The frames of each of the groups are coupled, and the response data is extracted from the coupled frames of each group. The BS demodulated signal has a data rate lower than that of the OFDM demodulated signal. An amount of stored data and a rate of accumulation of data in the buffer 36 are smaller than those in the buffer 37, due to the provision of the decimator 34, so that the FFT block 38 is operated to obtain the BS demodulated signal for a period that is considerably shorter than a period for which the FFT block 38 is operated to obtain the OFDM demodulated signal. Therefore, the FFT block 38 can be shared by the OFDM demodulator 21d and the BS demodulator 21e, as in the present embodiment. Thus, the transformation of the data supplied from the buffer 36 and the transformation of the data supplied from the buffer 37 can be alternately effected at a sufficiently high speed, by suitably operating the switch 39a. The common use of the FFT block 38 by the OFDM demodulator 21d and BS demodulator 21e is effective to simplify the construction of the system and improve the processing efficiency. It is noted that although the obtained OFDM demodulated signal contains a low-frequency component corresponding to the reflected wave, it is possible to extract, as the demodulated signal, only a component corresponding to the frequencies of the carriers of the OFDM signal, while ignoring the reflected wave component whose signal level is low. Alternatively, a filter may be provided between the A/D converter 31 and the buffer 37, such that the reflected wave component is removed by the filter from the output of the A/D converter 31.

Referring next to the block diagram of FIG. 4, the arrangement of the transponder 3a will be described. It is noted that the other transponders 3b, 3c are identical in construction with the transponder 3a, and the following description of the transponder 3a applies to the transponders 3b, 3c.

Figure 4:
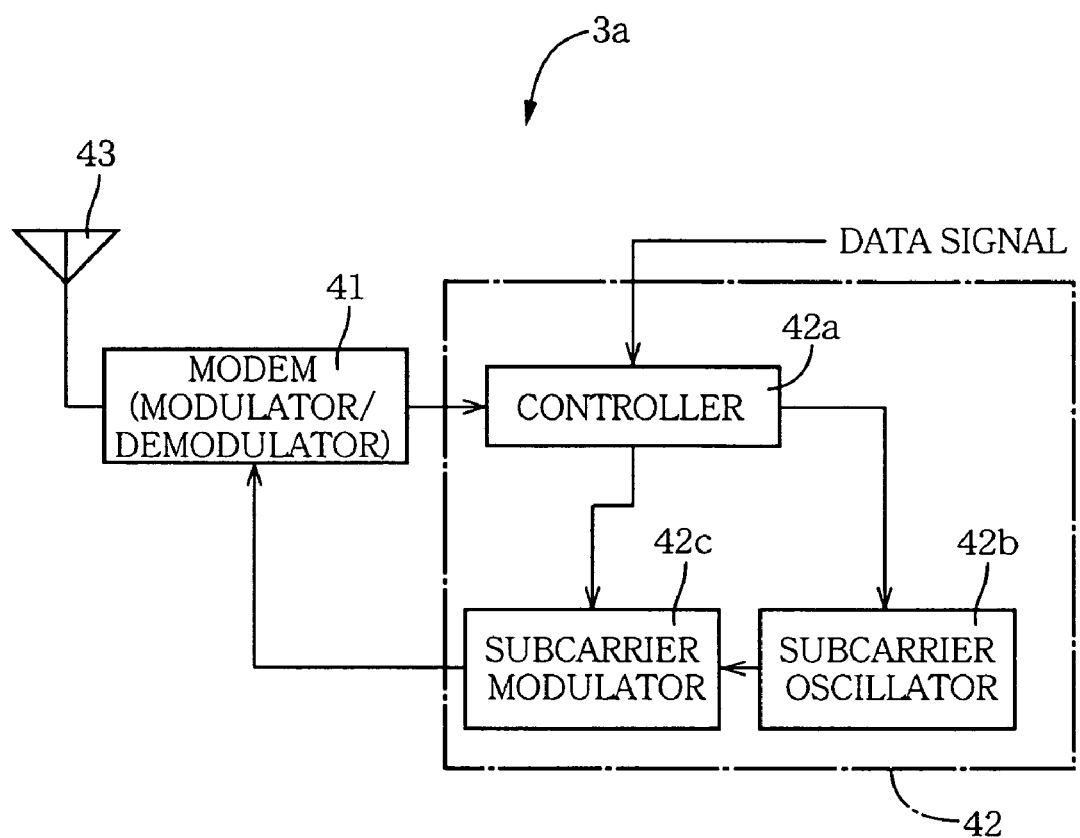
FIG. 4 is a block diagram showing an arrangement of a transponder included in the communication system of FIG. 1.

As shown in FIG. 4, the transponder 3a includes a MODEM (modulator/demodulator) 41, a digital circuit 42 and an antenna 43. The MODEM 41 is operable to demodulate the interrogating wave which has been transmitted from the interrogator 2 and then received by the antenna 43, and then output the demodulated wave to a controller 42a which serves as a transponder controller controlling the transponder 3a and which is included in the digital circuit 42. The MODEM 41 is further operable to modulate the interrogating wave with the subcarrier wave which has been modulated by a subcarrier modulator 42c of the digital circuit 42. The wave thus modulated by the MODEM 41 is transmitted as the reflected wave (response wave) from the antenna 43 toward the interrogator 2.

The digital circuit 42 includes a subcarrier oscillator 42b in addition to the above-described controller 42a and subcarrier modulator 42c. The subcarrier oscillator 42b is operable to oscillate or generate the subcarrier wave, and then output the generated subcarrier wave to the subcarrier modulator 42c. The subcarrier modulator 42c is controlled by the controller 42a, so as to modulate the subcarrier wave, as needed, with a data signal (e.g., transponder ID) by means of Phase Shifting Keying (PSK), and then to output the thus modulated subcarrier wave to the MODEM 41. The subcarrier wave generated by the subcarrier oscillator 42b has a hopped frequency ranging from a minimum frequency fl to a maximum frequency fh. It is noted that the subcarrier oscillator 42b and the subcarrier modulator 42c may be provided by a software arrangement utilizing a clock of the controller 42a. The modulation of the subcarrier wave by the subcarrier modulator 42c may be effected by Amplitude Shift Keying (ASK) or Frequency Shift Keying (FSK), as well as by the Phase Shift Keying (PSK) described above. The subcarrier oscillator 42b and the subcarrier modulator 42c may be constituted by a single chip built in the controller 42a.

The interrogating wave, which has been transmitted from the interrogator 2 and then received by the antenna 43, is demodulated by the MODEM 41, and is then outputted to the controller 42a of the digital circuit 42. With the demodulated interrogating wave being inputted to the controller 42a, the controller 42a detects reception of the interrogating wave by the transponder 3a. Upon detection of the reception of the interrogating wave, the subcarrier modulator 42c is controlled by the controller 42a, to modulate the subcarrier wave (supplied from the subcarrier oscillator 42b) with the response data signal, and to then output the thus modulated subcarrier wave to the MODEM 41. The MODEM 41 modulates the interrogating wave (which is being received) with the subcarrier wave which has been modulated by the subcarrier modulator 42c. The thus modulated interrogating wave is transmitted as the response wave from the antenna 43 toward the interrogator 3.

The response wave, which is transmitted by the transponder 3 to respond to the interrogator 2a upon reception of the interrogating wave from the interrogator 2a, has frequency bands, one of which ranges from frequency fca–fh to frequency fca–fl and the other of which ranges from frequency fca+fl to frequency fca+fh. The response wave, which is transmitted by the transponder 3 to respond to the interrogator 2b upon reception of the interrogating wave from the interrogator $2b$, has frequency bands, one of which ranges from frequency $fcb-fh$ to frequency $fcb-fl$ and the other of which ranges from frequency $fcb+fl$ to frequency $fcb+fh$. The response wave, which is transmitted by the transponder 3 to respond to the interrogator $2c$ upon reception of the interrogating wave from the interrogator $2c$, has frequency bands, one of which ranges from frequency $fcc-fh$ to frequency $fcc-fl$ and the other of which ranges from frequency $fcc+fl$ to frequency $fcc+fh$. The response wave, which is transmitted by the transponder 3 to respond to the interrogator $2d$ upon reception of the interrogating wave from the interrogator $2d$, has frequency bands, one of which ranges from frequency $fcd-fh$ to frequency $fcd-fl$ and the other of which ranges from frequency $fcd+fl$ to frequency $fcd+fh$. The response wave, which is transmitted by the transponder 3 to respond to the interrogator $2e$ upon reception of the interrogating wave from the interrogator $2e$, has frequency bands, one of which ranges from frequency $fce-fh$ to frequency $fce-fl$ and the other of which ranges from frequency $fce+fl$ to frequency $fce+fh$.

Figure 5A:
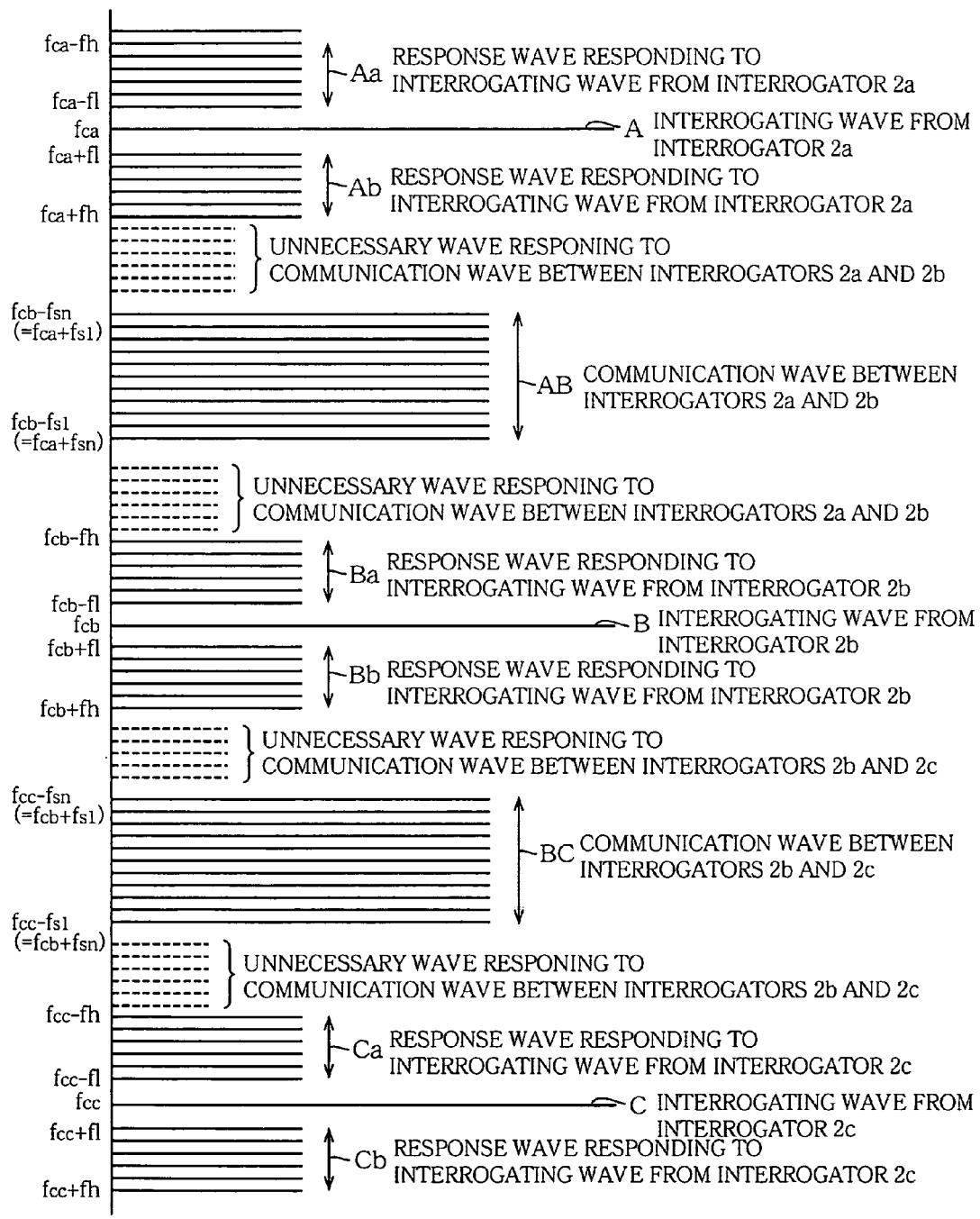
FIGS. 5A and 5B are a set of views showing an arrangement of frequencies of electric waves used in the communication system of FIG. 1.
Figure 5B:
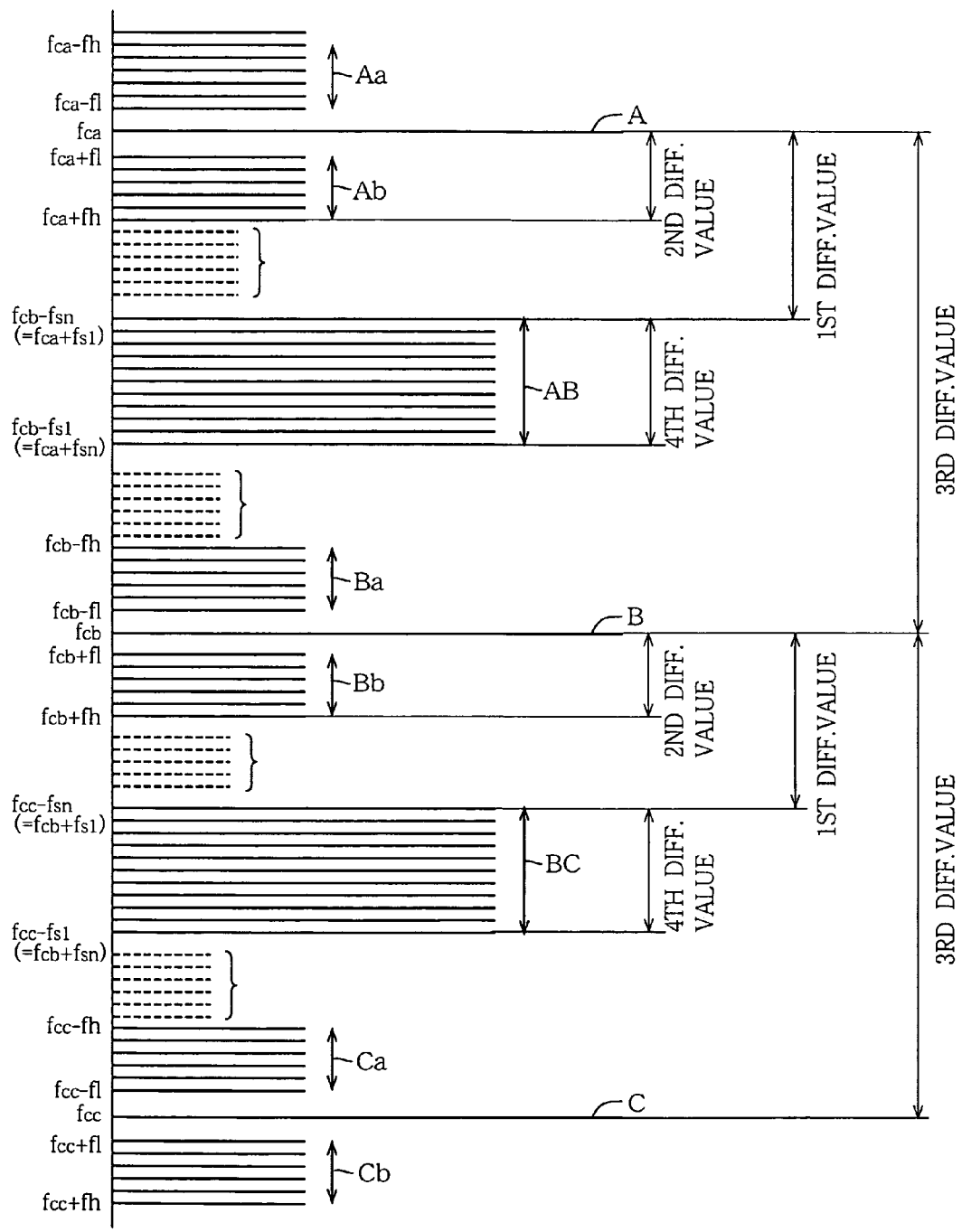

Referring next to FIGS. 5A and 5B, there will be described allocation of the frequencies of the electric waves used in the communications effected in the communication system 1. It is noted that FIGS. 5A and 5B are views which are identical with each other, except that each of the waves is briefly explained in FIG. 5A while first through fourth difference values (which are described below) are indicated in FIG. 5B.

A frequency band A (constituted by frequency $fca$) represents the frequency of the interrogating wave transmitted by the interrogator $2a$. A frequency band Aa (ranging from frequency $fca-fh$ to frequency $fca-fl$) and a frequency band Ab (ranging from frequency $fca+fl$ to frequency $fca+fh$) represent the frequency bands of the response wave generated by modulating the interrogating wave (which has been transmitted from the interrogator $2a$) and transmitted from the transponder 3 to the interrogator $2a$. A frequency band AB (ranging from frequency $fcb-fsn$ to frequency $fcb-fs1$, namely, ranging from frequency $fca+fs1$ to frequency $fca+fsn$) represents the frequency band of the communication wave used for the communication between the interrogators $2a$, $2b$. A frequency band B (constituted by frequency $fcb$) represents the frequency of the interrogating wave transmitted by the interrogator $2b$. A frequency band Ba (ranging from frequency $fcb-fh$ to frequency $fcb-fl$) and a frequency band Bb (ranging from frequency $fcb+fl$ to frequency $fcb+fh$) represent the frequency bands of the response wave generated by modulating the interrogating wave (which has been transmitted from the interrogator $2b$) and transmitted from the transponder 3 to the interrogator $2b$. A frequency band BC (ranging from frequency $fcb+fs1$ to frequency $fcb+fsn$, namely, ranging from frequency $fcc-fsn$ to frequency $fcc-fs1$) represents the frequency band of the communication wave used for the communication between the interrogators $2a$, $2b$. A frequency band C (constituted by frequency $fcc$) represents the frequency of the interrogating wave transmitted by the interrogator $2c$. A frequency band Ca (ranging from frequency $fcc-fh$ to frequency $fcc-fl$) and a frequency band Cb (ranging from frequency $fcc+fl$ to frequency $fcc+fh$) represent the frequency bands of the response wave generated by modulating the interrogating wave (which has been transmitted from the interrogator $2c$) and transmitted from the transponder 3 to the interrogator $2c$.

In the present embodiment, the transmission of the communication wave from one of the adjacent interrogators $2a$, $2b$ to the other of the interrogators $2a$, $2b$ and the transmission of the communication wave from the other of the interrogator $2a$, $2b$ to the one of the interrogators $2a$, $2b$ are effected alternately rather than simultaneously. As to the other adjacent pairs of the interrogators 2, the transmission of the communication wave from one of the pair to the other and the transmission of the communication wave from the other to the one of the pair are effected alternately rather than simultaneously. In this sense, as is apparent from the above description, each adjacent pair of the interrogators 2 share the frequency band used for the communication waves for communicating with each other. The frequency $fca$ of the interrogating wave of the interrogator $2a$, frequency $fcb$ of the interrogating wave of the interrogator $2b$, minimum carrier frequency $fs1$ and maximum carrier frequency $fsn$ are determined such that the frequency band of the communication wave transmitted from the interrogator $2a$ to the interrogator $2b$ and the frequency band of the communication wave transmitted from the interrogator $2b$ to the interrogator $2a$ overlap with each other, as shown in FIG. 5. Similarly, the frequency of the interrogating wave of one of each adjacent pair of the interrogators 2 and the frequency of the interrogating wave of the other of the adjacent pair of interrogators 2 are determined such that the frequency band of the communication wave transmitted from one of the adjacent pair of interrogators 2 to the other of the adjacent pair of interrogators 2 and the frequency band of the communication wave transmitted from the other of the adjacent pair of interrogators 2 to the one of the adjacent pair of interrogators 2 overlap with each other.

Further, the minimum carrier frequency $fs1$, maximum carrier frequency $fsn$, minimum hopping frequency $fl$ and maximum hopping frequency $fh$ are determined such that the frequency band Ab of the response wave which is generated by modulating the interrogating wave (that has been transmitted from the interrogator $2a$) and which is transmitted from the transponder 3 to the interrogator $2a$, and the frequency band AB of the communication wave used for the communication between the interrogators $2a$, $2b$ do not overlap with each other, namely, such that the frequency band of the response wave generated by modulating the interrogating wave (which has been transmitted from each of the interrogators 2) and transmitted from the transponder 3 (to the each of the interrogators 2), and the frequency band of the communication wave used for the communication between the adjacent interrogators do not overlap with each other, as shown in FIG. 5.

Since the frequency band of the communication wave and the frequency band of the response wave are separated from each other, as described above, there is substantially no risk of interference of the communication wave and the response wave to each other, thereby enabling the communication between the interrogators and the communication between the interrogator and the transponder to be effected concurrently with each other.

Further, the minimum carrier frequency $fs1$, maximum carrier frequency $fsn$, minimum hopping frequency $fl$ and maximum hopping frequency $fh$ are determined such that the frequency band Ab of the response wave which is generated by modulating the interrogating wave (that has been transmitted from the interrogator $2a$) and which is transmitted from the transponder 3 to the interrogator $2a$ is closer to the frequency $fca$, than the frequency band AB of the communication wave used for the communication between the interrogators $2a$, $2b$, namely, such that the frequency band of the response wave transmitted from the transponder 3 to the corresponding interrogator 2 (that has transmitted the interrogating wave) is closer to the frequency of the interrogating wave transmitted by the corresponding interrogator 2, than the frequency band of the communication wave transmitted by that corresponding interrogator 2.

This arrangement makes it possible to reduce the frequency of the subcarrier wave oscillated by the subcarrier oscillator 42b of the transponder 3, thereby leading to reduction in the electric power consumed by the transponder 3. It is common that a communication system includes a large number of movable transponders each of which is equipped with, as a power source for activating the transponder, only a device utilizing an electric power obtained by rectifying the interrogating wave transmitted from the interrogator, or each of which is equipped with the power source in the form of a small battery having a small capacity. Thus, since the transponder commonly has a difficulty in obtaining an electric energy available for its activation, it is desirable to minimize an amount of consumption of electric energy by the transponder. The above-described frequency arrangement is effective to minimize the amount of the consumed electric energy.

For further reliably avoiding an interference in the communication effected in the communication system 1, it is preferable that the frequency band of the communication wave is separated not only from the frequency band of the response wave but also from the frequency band of unnecessary reflected wave (indicated by broken lines in FIG. 5) which is generated as a result of reflection of the communication wave (transmitted together with the interrogating wave from the interrogator 2) by the transponder 3. The transponder 3 transmits a reflected wave generated in response to the carriers of the communication wave having the frequencies fs1, fs2, . . . , fsn, in addition to the reflected wave generated in response to the interrogating wave. In this instance, the reflected wave generated in the response to the communication wave is given substantially the same band width as the reflected wave generated in response to the interrogating wave. Thus, the unnecessary reflected wave having a frequency band ranging from frequency fc1−fh to frequency fsn+fl is generated for each of the communication waves. As is gathered from FIGS. 5A and 5B, one of two limiting frequencies defining the frequency band of the reflected wave generated in response to the interrogating wave, which one is more distant from the frequency of the interrogating wave than the other limiting frequency, is different from the frequency of the interrogating wave by a second difference value (see FIG. 5B) corresponding to fh. Meanwhile, the two limiting frequencies defining the frequency band of the reflected wave generated in response to the communication wave are different from each other by the same difference value corresponding to fh.

In view of the fact described above, the minimum carrier frequency fs1 and the maximum hopping frequency fh are determined such that a first difference value (see FIG. 5B) corresponding to fs1 is at least substantially twice as large as the second difference value corresponding to fh, namely, such that the following expression is satisfied.

$$fs1 \geq 2 \times fh \tag{1}$$

A difference (fs1) between the frequency (fca) of the interrogating wave transmitted from the interrogator 2a and a lower one (fca+fs1) of two limiting frequencies defining the frequency band AB of the communication wave used for the communication between the interrogators 2a, 2b corresponds to the above-described first difference value. In other words, the difference (fs1) between the frequency (fca) of the interrogating wave and the frequency (fca+fs1) which is the closest to the frequency (fca) of the interrogating wave, among the frequency band AB of the communication wave corresponds to the above-described first value. Thus, the first difference value is defined as a difference between the frequency of the interrogating wave transmitted from each of the interrogators 2 and one of upper and lower limit values of the frequency band of the communication wave transmitted from the each of the interrogators 2, which one is closer to the frequency of the interrogating wave transmitted from the each of the interrogators 2, than the other of the upper and lower limit values. A difference (fh) between the frequency (fca) of the interrogating wave transmitted from the interrogator 2a and a higher one (fca+fh) of two limiting frequencies defining the frequency band Ab of the response wave (reflected wave) responding to the interrogating wave transmitted from the interrogator 2a corresponds to the above-described second difference value. In other words, the difference (fh) between the frequency (fca) of the interrogating wave and the frequency (fca+fh) which is the most distant from to the frequency (fca) of the interrogating wave, among the frequency band Ab of the response wave (reflected wave) corresponds to the above-described second difference value. Thus, the second difference value is defined as a difference between the frequency of the interrogating wave transmitted from each of the interrogators 2 and one of upper and lower limit values of the frequency band of the response wave (reflected wave) transmitted to respond to the each of the interrogators 2, which one is more distant from the frequency of the interrogating wave transmitted from the each of the interrogators 2, than the other of the upper and lower limit values.

With the minimum carrier frequency fs1 and the maximum hopping frequency fh being set as described above, the reflected wave generated in response to the interrogating wave is not likely to overlap in frequency band with the reflected wave generated in response to the communication wave, even where the communication wave used for the communication between the interrogators is reflected by the transponder. This arrangement is effective to increase reliability of the communication effected in the system, whereby the communication between the interrogator and transponder and the communication between the interrogators can be simultaneously effected. It is preferable that the first difference value is exactly twice as large as the second difference value (or is made close to twice of the second difference value as much as possible), for increasing the efficiency of utilization of the frequency resources.

Where the communication wave emitted from each of the interrogators has the same maximum and minimum carrier frequencies as the communication wave emitted from at least one of the interrogators adjacent to the each of the interrogators while the response waves (reflected wave) emitted from the respective transponders have the same frequency width, the frequencies of the interrogating waves transmitted from each adjacent pair of the interrogator, the minimum carrier frequency fs1, the maximum carrier frequency fsn and the maximum hopping frequency fh are determined such that a third difference value (corresponding to fcb−fca) is substantially equal to or larger than a sum of a fourth difference value (corresponding to fsn−fs1) and four times of the above-described second difference value, namely, such that the following expression is satisfied.

$$fcb-fca \geq 4 \times fh + (fsn-fs1) \tag{2}$$

A difference (fcb−fca) between the frequency (fca) of the interrogating wave transmitted from the interrogator 2a and the frequency (fcb) of the interrogating wave transmitted from the interrogator 2b corresponds to the above-described third difference value. Thus, the third difference value is defined as a difference between the frequency of the interrogating wave transmitted from each of the interrogators 2 and the frequency of the interrogating wave transmitted from one of the interrogators 2 that is adjacent to the each of the interrogators 2. A width (fsn−fs1) of the frequency band AB of the communication wave used for the communication between the interrogators 2a, 2b corresponds to the above-described fourth difference value. Thus, the fourth difference value is defined as a difference between upper and lower limit values of the frequency band of the communication wave transmitted from the each of the interrogators 2.

With the frequencies of the interrogating waves transmitted from each adjacent pair of the interrogator, the minimum carrier frequency fs1, maximum carrier frequency fsn and the maximum hopping frequency fh being set as described above, the reflected wave transmitted from the transponder in response to the interrogating wave, the reflected wave transmitted from the transponder in response to the communication wave and the communication wave can be prevented from interfering with one another, whereby the reliability of the communication effected in the system is increased. It is preferable that the third difference value is equalized to the above-described sum of the fourth difference value and four times of the second difference value (or is made close to the sum of the fourth difference value and four times of the second difference value), for increasing the efficiency of utilization of the frequency resources.

As is clear from the above description, in the communication system constructed according to the present invention in which the communication among the interrogators 2 is effected in a wireless manner, it is possible to easily change positions of the interrogators 2 and to easily increase of the number of the interrogators 2 in the system. The absence of wiring leads to an excellent appearance of the communication system 1, too. In the communication system 1 according to the first embodiment of the invention in which the frequencies are set as described above, the reflected wave transmitted in response to the interrogating wave, the reflected wave transmitted in response to the communication wave and the communication wave can be prevented from interfering with one another, whereby the reliability of the communication effected in the system 1 is increased. Further, it is possible to efficiently utilize the limited frequency resources. In addition, in a case where information is transmitted from one of the interrogators 2 which is distant from the interrogator 2a having function of carrying out service procedures, toward the interrogator 2a, the information can be transmitted via one or ones of the interrogators 2 disposed between the information transmitting interrogator 2 and the interrogator 2a. This arrangement is effective to reduce an amount of electric power required by the communication wave for the communication among the interrogators 2.

Second Embodiment

Figure 6:
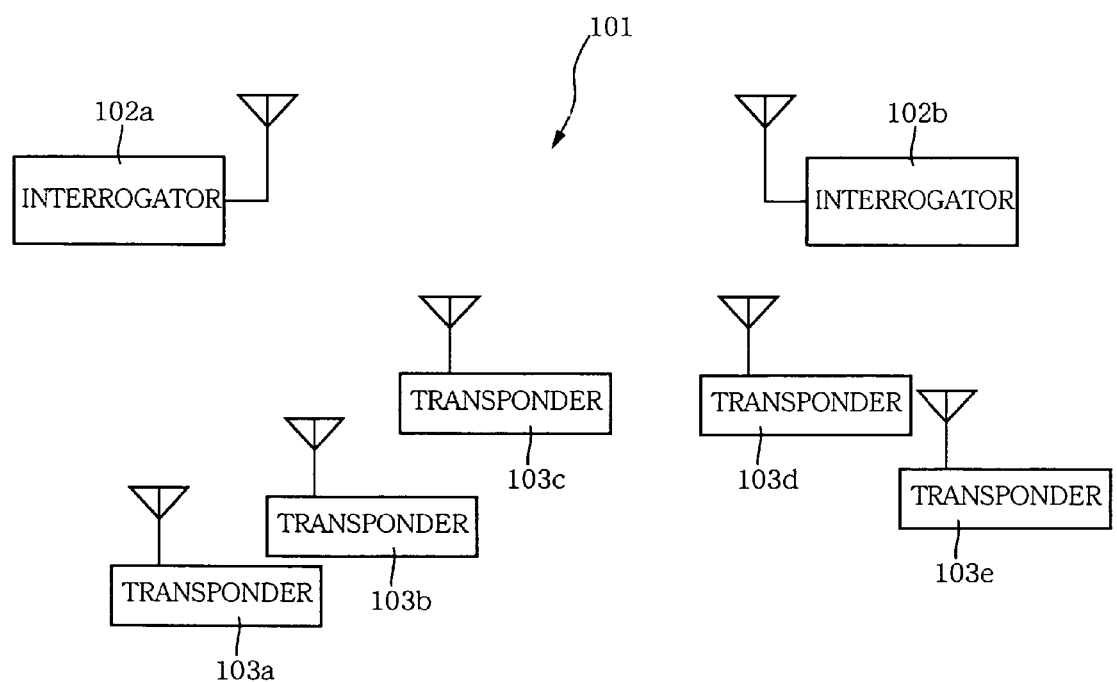
FIG. 6 is a view showing an arrangement of a communication system constructed according to a second embodiment of the invention.

Referring next to FIGS. 6-10 and 15, there will be described a communication system 101 constructed according to a second embodiment of the invention. As shown in FIG. 6, this communication system 101 includes two interrogators 102a, 102b (which will be referred simply to as interrogators 102 where they do not have to be distinguished from each other) and three transponders 103a, 103b, 103c, 103d, 103e (which will be referred simply to as transponders 103 where they do not have to be distinguished from each other). Although the communication system 101 shown in FIG. 6 includes the two interrogators 102 and the five transponders 103, the numbers of them may be changed depending upon scale of the communication system and service environment.

Each of the interrogators 102 is operable to emit an interrogating wave containing a main carrier wave and a transmission-data-signal modulated wave which is generated by modulating the main carrier wave with a transmission data signal (generated based on transmission information). Each of the transponders 103 is operable, upon reception of the interrogating wave transmitted from one of the interrogators 102, to respond with a reflected wave (response wave) generated by modulating the main carrier wave (contained in the interrogating wave) with a response data signal representative of response information (e.g., data-reception request signal and identification data identifying the transponder) that is to be transmitted as a response to the one of the interrogators 102. When the one of the interrogators 102 (having transmitted the interrogating wave) receives the reflected wave transmitted from the transponder 103, this one of the interrogators 102 extracts the response data signal from the reflected wave. In this instance, the transponder 103 transmits also a reflected wave generated by modulating the transmission-data-signal modulated wave (which is also contained in the interrogating wave) with the response data signal. This reflected wave is ignored by the interrogator 102, since its intensity or strength is low.

Further, each of the interrogators 102 is operable to emit a communication wave containing the main carrier wave and the transmission-data-signal modulated wave. At least one of the interrogators 102, which is located within an area allowing communication with the interrogator 102 having emitted the communication wave, receive the communication wave, and then extraxts the transmission data signal contained in the received communication wave, so as to obtain the transmission information.

There will be described electric arrangements of the interrogators 102a, 102b and the transponders 103a-103e, by reference to the drawings.

Figure 7:
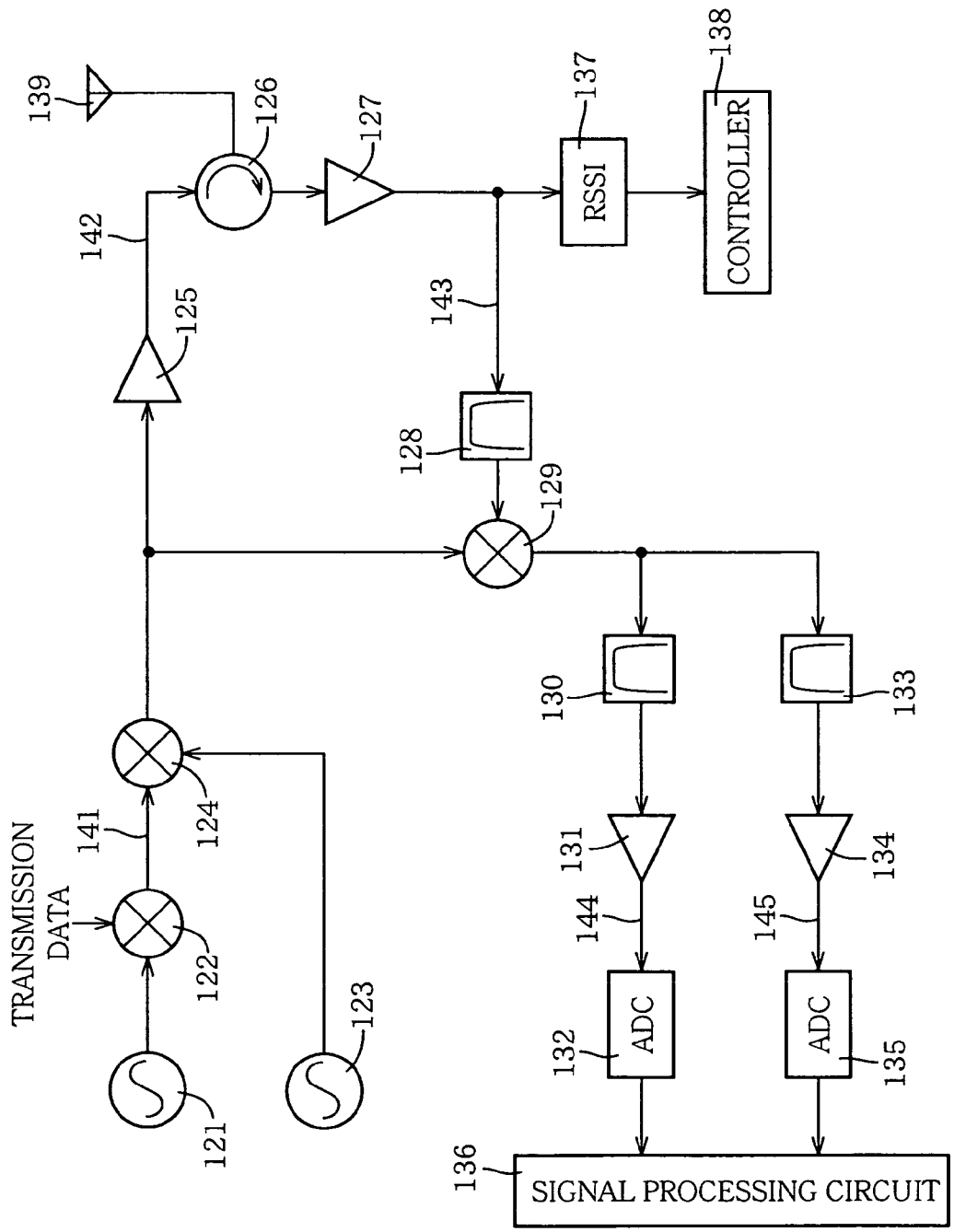
FIG. 7 is a block diagram showing an arrangement of an interrogator included in the communication system of FIG. 6.
Figure 8:
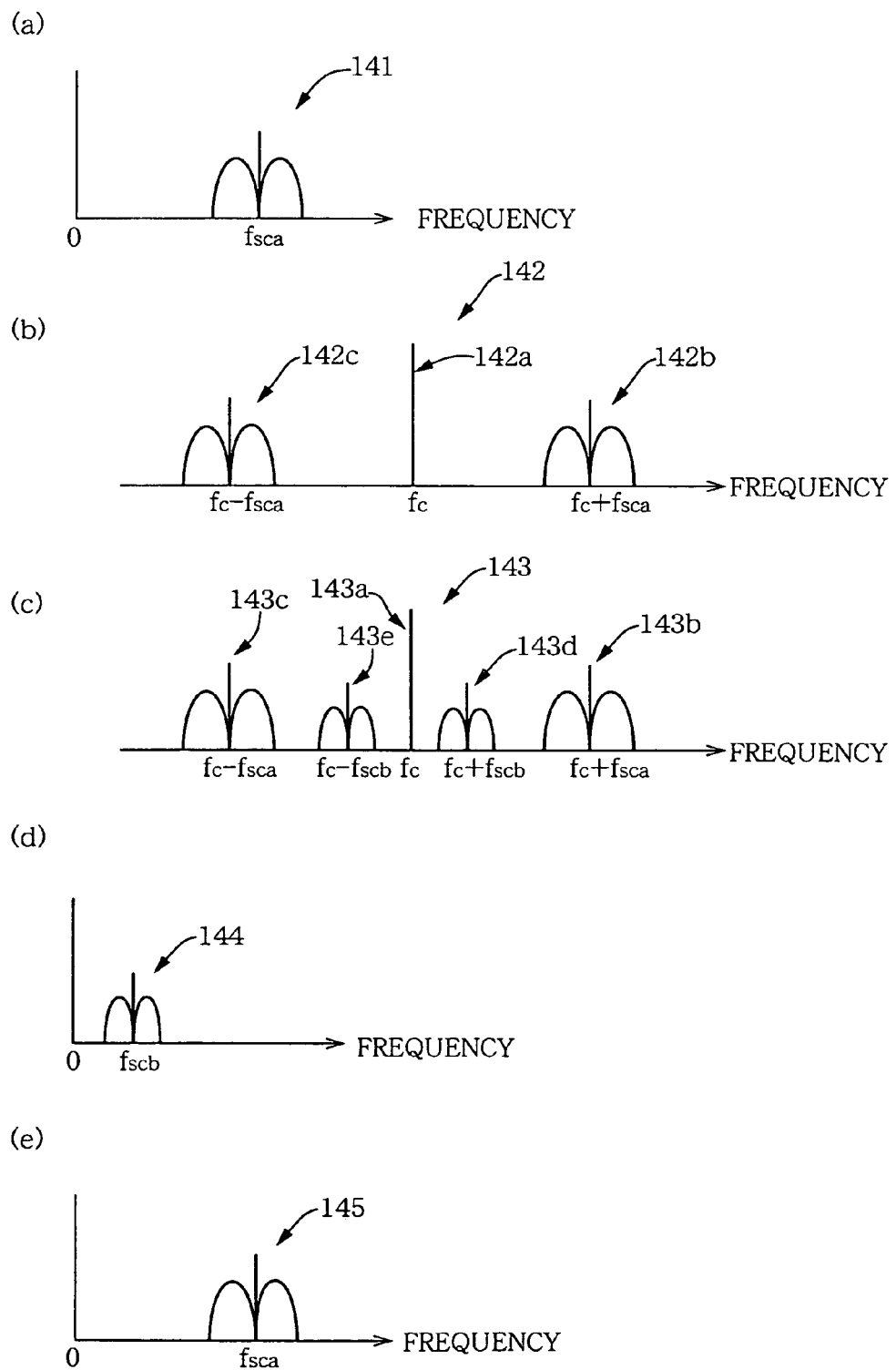
FIG. 8 is a set of views showing outputs of various devices constituting the interrogator of FIG. 7.

Referring to FIGS. 7 and 8, the arrangement of the interrogator 102a will be first described. FIG. 7 is a block diagram showing the arrangement of the interrogator 102a. FIG. 8 is a set of views showing outputs of various devices constituting the interrogator 102a. It is noted that the views (a)-(e) of FIG. 8 are positioned relative to each other on its drawing sheet such that the outputs illustrated in the views (a)-(e) are comparable with each other with respect to their frequencies which are taken along abscissas (horizontal axes) of the respective views (a)-(e). It is also noted that the interrogator 102b is identical in construction with the interrogator 102a, and the following description as to the interrogator 102a can be applied to the interrogator 102b.

As shown in FIG. 7, the interrogator 102a includes a subcarrier oscillator 121, a subcarrier modulator 122, a main carrier oscillator 123, a main carrier modulator 124, an amplifier 125, a circulator 126, a low noise amplifier (LNA) 127, a received wave filter 128, a received wave demodulator 129, a first filter 130, an amplifier 131, an A/D converter 132, a second filter 133, an amplifier 134, an A/D converter 135, a signal processing circuit 136, a received signal strength indicator (RSSI) 137, a controller 138 and an antenna 139.

The subcarrier oscillator 121 is operable to oscillate or generate a subcarrier having a frequency fsca, and to then output the generated subcarrier to the subcarrier modulator 122. It is noted that a subcarrier oscillator provided in the interrogator 102b is arranged to generate a subcarrier having the same frequency fsca.

The subcarrier modulator 122 is operable to generate the transmission data signal 141 based on the transmission information (such as data transmitted from the transponder 103 and received directly from the transponder 103, data transmitted from the transponder 103 and inputted from the interrogator 102b, and identification data identifying the interrogator 102 which has first received the data transmitted from the transponder 103). That is, the subcarrier modulator 122 generates the transmission data signal, by modulating the subcarrier (supplied from the subcarrier oscillator 121) with the transmission information. The thus generated transmission data signal is outputted to the main carrier modulator 124. This transmission data signal 141, which is outputted from the subcarrier modulator 122, consists of the subcarrier (having the frequency fsca) and sidebands located on respective opposite sides of the subcarrier frequency fsca, as shown in the view (a) of FIG. 8. In the present second embodiment, the subcarrier modulator 122 serves as a transmission data signal generator operable to generate the transmission data signal 141 based on the information that is to be transmitted to the other interrogator 102b such that a frequency band of the generated transmission data signal 141 is different from (or higher than) a frequency band of the response data signal contained in the reflected wave which is transmitted from the transponder 103.

The main carrier oscillator 123 is operable to generate the main carrier having a frequency fc, and to then output the generated main carrier to the main carrier modulator 124. It is noted that a main carrier oscillator provided in the interrogator 102b is arranged to generate a main carrier having the same frequency fc.

The main carrier modulator 124 is operable to generate a transmission-data-signal modulated wave, by modulating the main carrier with the transmission data signal. That is, the main carrier modulator 124 generates the transmission-data-signal modulated wave, by modulating the main carrier (which has been supplied from the main carrier oscillator 123), with the transmission data signal (which has been supplied from the subcarrier modulator 122), and then outputs the main carrier and the transmission-data-signal modulated wave, to the amplifier 125 and the received wave demodulator 129.

The amplifier 125 is operable to electrically amplify the main carrier and the transmission-data-signal modulated wave which have been supplied from the main carrier modulator 124, and to then output a transmission wave 142 containing the main carrier and the transmission-data-signal modulated wave which have been amplified. The transmission wave 142 as an output of the amplifier 125 is supplied to the circulator 126. As shown in the view (b) of FIG. 8, this transmission wave 142 contains the main carrier 142a having the frequency fc, an upper sideband 142b located around a frequency fc+fsca, and a lower sideband 142c located around a frequency fc−fsca. The upper and lower sidebands 142b, 142c are components of the transmission-data-signal modulated wave.

The circulator 126 is operable to separate an output signal that is to be outputted from the interrogator 102a and an input signal that is to be inputted to the interrogator 102a, from each other. Specifically, the circulator 126 supplies the transmission wave 142 (which has been supplied from the amplifier 125) to the antenna 139, while supplying a received wave (which has been transmitted to the antenna 139) to the LNA 127. The transmission wave is emitted from the antenna 139. In the present embodiment, the amplifier 125, circulator 126 and antenna 139 cooperate with each other to constitute a transmitter which is operable to transmit the transmission wave containing the main carrier and the transmission-data-signal modulated wave. The antenna 139, circulator 126 and LNA 127 cooperate with each other to constitute a receiver which is operable to receive the reflected wave and the communication wave which have been transmitted from the transponder and the other interrogator, respectively.

The LNA 127 is operable to electrically amplify the received wave supplied from the circulator 126, and to then supply the amplified received wave 143 to the received wave filter 128 and the RSSI 137. As shown in the view (c) of FIG. 8, components which can be contained in the received wave 143 as an output of the LNA 127 are: a main carrier 143a having the frequency fc and contained in the communication wave transmitted from the other interrogator 102b; upper and lower sidebands 143b, 143c as components of the transmission-data-signal modulated wave contained in the communication wave transmitted from the other interrogator 102b; and upper and lower sidebands 143d, 143e as components of the reflected wave transmitted from the transponder 103. The upper sideband 143b of the transmission-data-signal modulated wave is located around a frequency fc+fsca, while the lower sideband 143c located around a frequency fc−fsca. The upper sideband 143d of the reflected wave is located around a frequency fc+fscb, and is closer to the main carrier 143a, than the upper sideband 143b of the transmission-data-signal modulated wave. The lower sideband 143e of the reflected wave is located around a frequency fc−fscb, and is closer to the main carrier 143a, than the lower sideband 143c of the transmission-data-signal modulated wave. It is noted that the communication wave is inhibited from being emitted from each of the interrogators 102 at least while the communication wave is being received by the each of the interrogators 102 from the other of the interrogators 102. This arrangement eliminates a possibility that the communication wave transmitted from the other of the interrogators 102 and the reflected wave transmitted from the transponder 103 in response to the main carrier contained in the communication wave transmitted from the each of the interrogators 102 are simultaneously contained in the received wave.

However, the frequency fsca of the subcarrier generated by the subcarrier oscillator 121 and the frequency fscb of the subcarrier generated by a subcarrier oscillator (which will be described below) of the transponder 103 are suitably determined, such that the transmission-data-signal modulated wave 143b, 143c and the reflected wave 143d, 143e do not overlap with each other, and such that the reflected wave 143d, 143e is closer to the main carrier 143a, than the transmission-data-signal modulated wave 143b, 143c, namely, such that the frequency of the transmission data signal is higher than the frequency of the response data signal (such that the frequency of the response data signal is lower than the frequency of the transmission data signal).

The received wave filter 128 is provided by a band-pass filter, and is arranged to pass the received wave (which has been amplified by the LNA 127) so as to supply the amplified received wave to the received wave demodulator 129.

The received wave demodulator 129 is operable to demodulate the received wave (which has passed through the received wave filter 128) with an output supplied from the main carrier wave modulator 124. That is, the received wave demodulator 129 demodulates the received wave with the output in the form of the main carrier and the transmission-data-signal modulated wave which are supplied from the main carrier wave modulator 124. The thus demodulated wave containing the response data signal (transmitted from the transponder 103) and the transmission data signal (transmitted from the other interrogator 102b) is supplied as an output of the received wave demodulator 129, to the first and second filters 130, 133.

The first filter 130 is provided by a band-pass filter arranged to pass only the response data signal among the output supplied from the received wave demodulator 129.

The amplifier 131 is operable to electrically amplify the response data signal, and to then output the amplified response data signal to the A/D converter 132. This response data signal 144, which has been outputted from the amplifier 131, is located around a frequency fscb as shown in the view of (d) of FIG. 8.

The A/D converter 132 is operable to convert the response data signal 144 as an analog signal which has been outputted from the amplifier 131, into a digital signal, and to then output the digitalized response data signal to the signal processing circuit 136.

The second filter 133 is provided by a band-pass filter arranged to pass only the transmission data signal among the output supplied from the received wave demodulator 129.

The amplifier 134 is operable to electrically amplify the transmission data signal, and to then output the amplified transmission data signal to the A/D converter 135. This transmission data signal 145, which has been outputted from the amplifier 134, is located around a frequency fsca as shown in the view of (e) of FIG. 8.

The A/D converter 135 is operable to convert the transmission data signal 145 as an analog signal which has been outputted from the amplifier 134, into a digital signal, and to then output the digitalized transmission data signal to the signal processing circuit 136.

The signal processing circuit 136 is arranged to extract the response data from the digitalized response data signal which has been outputted from the A/D converter 132, and to extract the transmission data from the digitalized transmission data signal which has been outputted from the A/D converter 135, so that the response data and the transmission data are subjected to predetermined procedures in the signal processing circuit 136.

The RSSI 137 is operable to detect the strength or intensity of the received wave which has been outputted from the LNA 127, and to output result of the detection to the controller 138. The controller 138 includes a communication wave reception determiner operable to determine, on the basis of the result of the detection made by the RSSI 137, whether or not the communication wave transmitted from the other interrogator 102b is being currently received by the above-described receiver (including the antenna 139) of the interrogator 102a. While the communication wave reception determiner determines that the communication wave is being received by the receiver, the above-described transmitter (including the antenna 139) of the interrogator 102a is controlled to suspend transmission of the communication wave to the other interrogator 102b.

Referring next to the block diagram of FIG. 9, the arrangement of the transponder 103a will be described. It is noted that the other transponders 103b-103e are identical in construction with the transponder 103a, and the following description of the transponder 103a can be applied to the other transponders 103b-103e.

Figure 9:
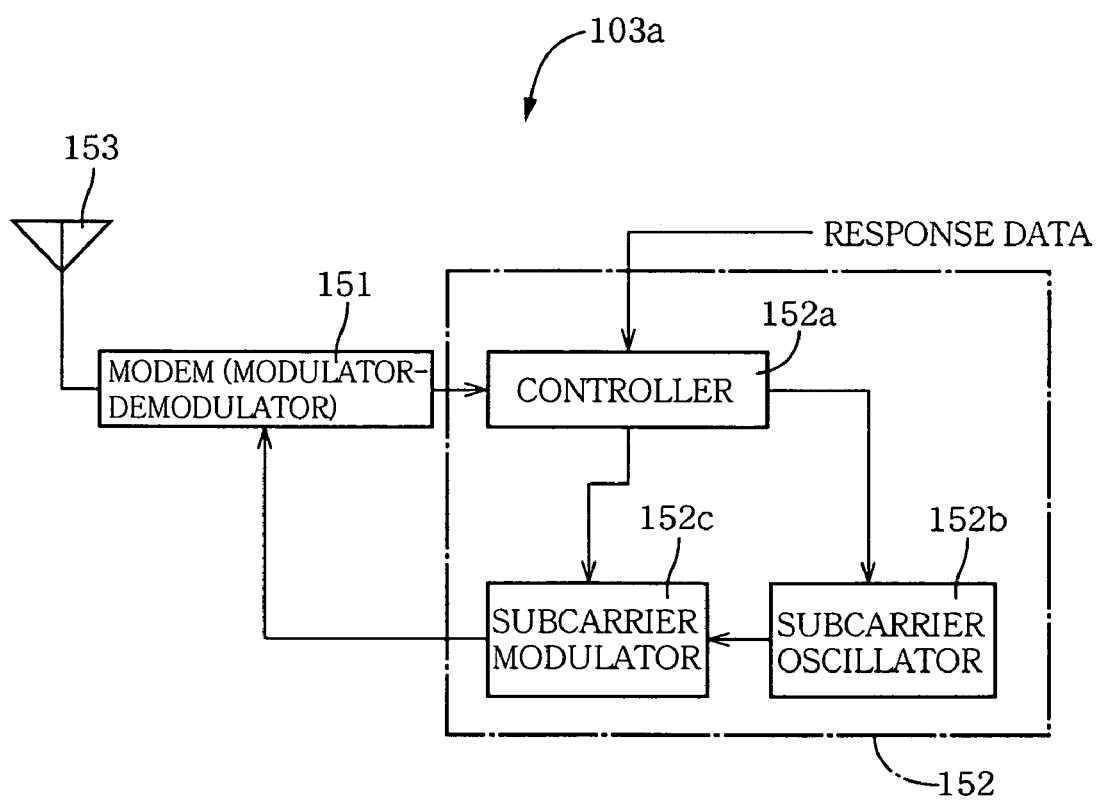
FIG. 9 is a block diagram showing an arrangement of a transponder included in the communication system of FIG. 6.

As shown in FIG. 9, the transponder 103a includes a MODEM (modulator/demodulator) 151, a digital circuit 152 and an antenna 153. The MODEM 151 is operable to demodulate the interrogating wave which has been transmitted from the interrogator 102 and then received by the antenna 153, and to then output the demodulated wave to a controller 152a which serves as a transponder controller controlling the transponder 103a and which is included in the digital circuit 152. The MODEM 151 is further operable to modulate the interrogating wave with the subcarrier wave which has been modulated by a subcarrier modulator 152c of the digital circuit 152. The wave thus modulated by the MODEM 151 is transmitted as the reflected wave (response wave) from the antenna 153 toward the interrogator 102. That is, the MODEM 151 serves as a main carrier wave reflector operable to modulate the main carrier wave transmitted from each of the interrogators 102, with the generated response data signal, and to respond to the each of the interrogators 102 with the reflected wave which is provided by the modulated main carrier wave.

Figure 15:
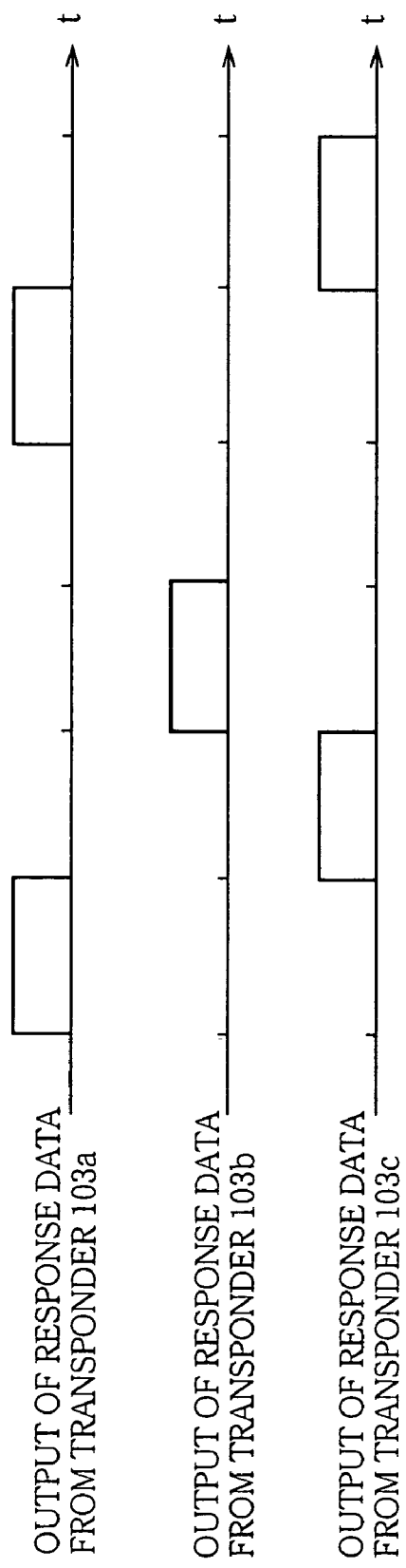
FIG. 15 is a view showing time slots at each of which response data is emitted from a corresponding one of transponders of the communication system of FIG. 6.

The digital circuit 152 includes a subcarrier oscillator 152b in addition to the above-described controller 152a and subcarrier modulator 152c. The subcarrier oscillator 152b is operable to oscillate or generate the subcarrier having the frequency fscb that is sufficiently lower than the frequency fsca, so that the subcarrier does not overlap with the frequency band of the transmission data signal which is located around the frequency fsca. The thus generated subcarrier is outputted to the subcarrier modulator 152c. The subcarrier modulator 152c serves as a response data signal generator operable to generate the response data signal based on information that is to be replied to the interrogator 102, such that the frequency band of the generated response data signal is lower than the frequency band of the transmission data signal. Specifically described, the subcarrier modulator 152c modulates the subcarrier which has been outputted from the subcarrier oscillator 152b, with the response information (e.g., data-reception request signal and identification data identifying the transponder) which has been inputted via the controller 152a, so as to generate a response-data-signal modulated wave (response data signal). The thus generated response data signal is outputted to the MODEM 151. The response data signal is outputted at a time slot which is randomly selected by the controller 152a, as shown in FIG. 15, for avoiding interference among the reflected waves respectively emitted from the plurality of transponders 103.

The reflected wave transmitted from the transponder 130 contains the main carrier having the frequency fc, the upper sideband 143d located around the frequency fc+fscb, and the lower sideband 143e located around the frequency fc−fscb (see the view (c) of FIG. 8).

Figure 10:
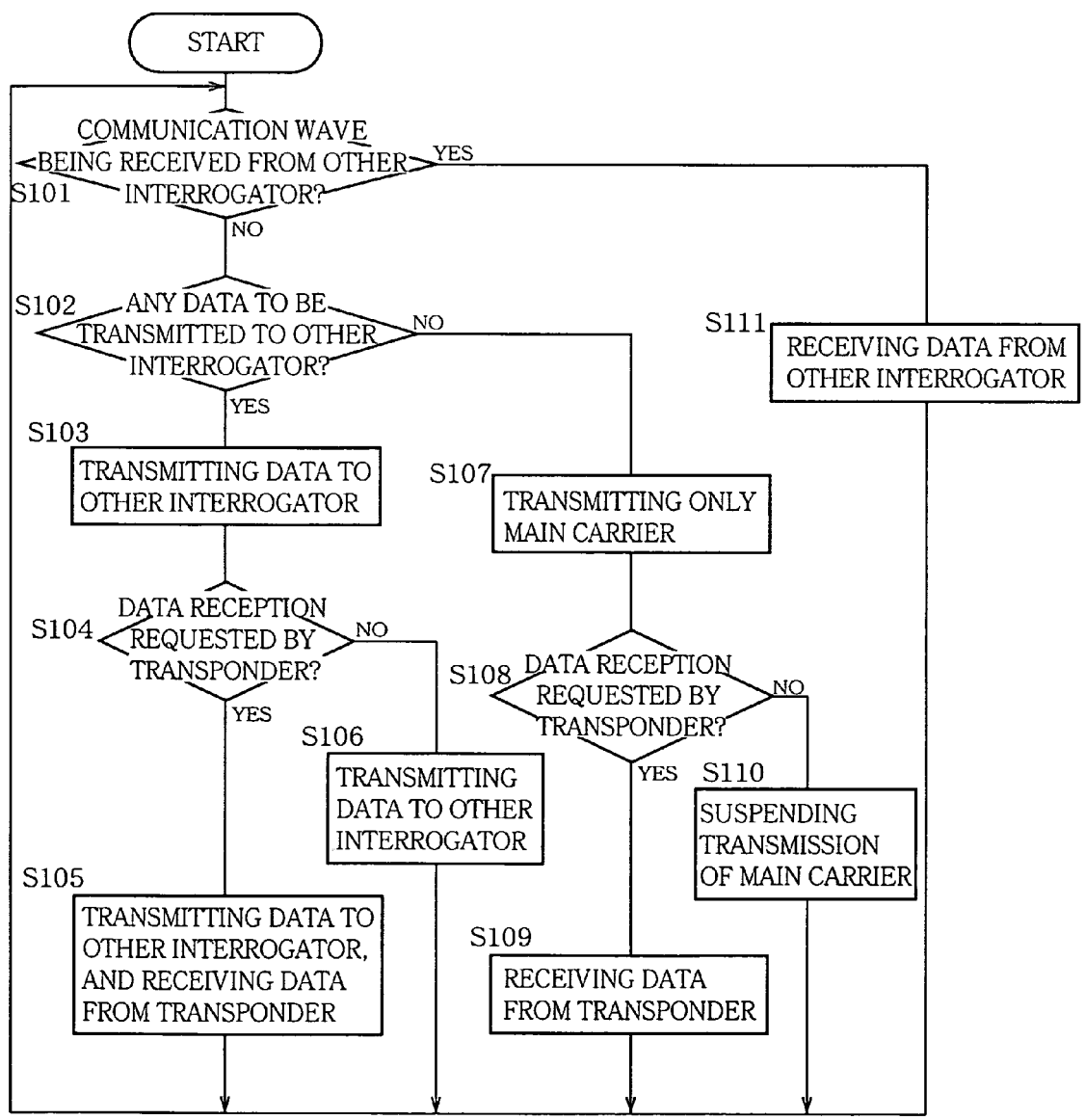
FIG. 10 is a flow chart illustrating a data communication routine executed by the interrogator of FIG. 7.

Referring next to the flow chart of FIG. 10, there will be described a data communication routine executed by the interrogator 102a of the communication system 101 constructed according to the present second embodiment of the invention. It is noted that a data communication routine executed by the interrogator 102b is substantially identical with the routine executed by the interrogator 102a, and the following description of the routine executed by the interrogator 102a can be applied to that executed by the interrogator 102b.

The data communication routine is initiated with step S101 which is implemented by the communication wave reception determiner of the controller 138, to determine whether the communication wave transmitted from the other interrogator 102b is being currently received by the interrogator 102a or not. This determination is made on the basis of the strength or intensity of the received wave inputted to the RSSI 137 via the antenna 139, circulator 126 and LNA 127. If the intensity of the received wave is not lower than a predetermined threshold, it is determined that the communication wave transmitted from the other interrogator 102b is being currently received by the interrogator 102a, namely, an affirmative decision (YES) is obtained in step S101.

If the affirmative decision (YES) is obtained in step S101, the control flow goes to step S111. If a negative decision (NO) is obtained in step S101, the control flow goes to step S102.

Step S102 is implemented to determine whether there is any data to be transmitted to the other interrogator 102b. If an affirmative decision (YES) is obtained in step S102, the control flow goes to step S103. If a negative decision (NO) is obtained in step S102, the control flow goes to step S107.

Step S103 is implemented to transmit the transmission data to the other interrogator 102b. Specifically, the subcarrier modulator 122 generates the transmission data signal, by modulating the subcarrier (supplied from the subcarrier oscillator 121), with the transmission data. Then, the main carrier modulator 124 modulates the transmission-data-signal modulated wave, by modulating the main carrier (supplied from the main carrier oscillator 123), with the generated transmission data signal. Then, the main carrier and the generated transmission-data-signal modulated wave are amplified by the amplifier 125, and the transmission wave containing the amplified main carrier and the amplified transmission-data-signal modulated wave is supplied to the antenna 139 via the circulator 126, so as to be transmitted from the antenna 139.

Step S103 is followed by step S104 which is implemented to determine whether data reception is being currently requested by at least one of the transponders 103a-103e. This determination is made based on the response data extracted from the response data signal in the signal processing circuit 136 to which the received wave (received by the antenna 139) has been inputted via the circulator 126, LNA 127, received wave filter 128, received wave demodulator 129, first filter 130, amplifier 131 and A/D converter 132.

If the affirmative decision (YES) is obtained in step S104, the control flow goes to step S105. If a negative decision (NO) is obtained in step S104, the control flow goes to step S106.

Step S105 is implemented to transmit the transmission data to the other interrogator 102b. Specifically, the subcarrier modulator 122 generates the transmission data signal, by modulating the subcarrier (supplied from the subcarrier oscillator 121), with the transmission data. Then, the main carrier modulator 124 modulates the transmission-data-signal modulated wave, by modulating the main carrier (supplied from the main carrier oscillator 123), with the generated transmission data signal. Then, the main carrier and the generated transmission-data-signal modulated wave are amplified by the amplifier 125, and the transmission wave containing the amplified main carrier and the amplified transmission-data-signal modulated wave is supplied to the antenna 139 via the circulator 126, so as to be transmitted from the antenna 139.

Further, in step S105, the response data is inputted from the transponder 103, while the transmission data is transmitted to the other interrogator 102b, as described above. Specifically, the received wave (received by the antenna 139) is inputted to the received wave demodulator 129 via the circulator 126, LNA 127 and received wave filter 128, and the received wave demodulator 129 demodulates the received wave with the main carrier and the transmission-data-signal modulated wave which have been supplied from the main carrier modulator 124 to the received wave demodulator 129. The thus demodulated signal is inputted to the signal processing circuit 136 via the first filter 130, amplifier 131 and A/D converter 132, and the response data is extracted from the response data signal in the signal processing unit 136. In this instance, although the demodulated signal contains the transmission-data-signal modulated wave in addition to the response-data-signal modulated wave, the transmission-data-signal modulated wave is rejected or removed by the first filter 130 provided by the band-pass filter. Thus, the reception of the reflected wave and the transmission of the communication wave can be effected concurrently with each other.

After the implementation of step S105, the control flow goes back to step S101 to initiate the next cycle of execution of the data communication routine.

If the negative decision (NO) is obtained in step S104, step S106 is implemented to transmit the transmission data to the other interrogator 102b. Specifically, the subcarrier modulator 122 generates the transmission data signal, by modulating the subcarrier (supplied from the subcarrier oscillator 121), with the transmission data. Then, the main carrier modulator 124 modulates the transmission-data-signal modulated wave, by modulating the main carrier (supplied from the main carrier oscillator 123), with the generated transmission data signal. Then, the main carrier and the generated transmission-data-signal modulated wave are amplified by the amplifier 125, and the transmission wave containing the amplified main carrier and the amplified transmission-data-signal modulated wave is supplied to the antenna 139 via the circulator 126, so as to be transmitted from the antenna 139. After the implementation of step S106, the control flow goes back to step S101 to initiate the next cycle of execution of the data communication routine.

If the negative decision (NO) is obtained in step S102, step S107 is implemented to transmit only the main carrier. Specifically, for example, the activation of the subcarrier oscillator 121 is suspended, so that subcarrier oscillator 121 does not supply the subcarrier to the subcarrier modulator 122. Meanwhile, the main carrier oscillator 123 generates the main carrier, and the generated main carrier is supplied via the main carrier modulator 124, amplifier 125 and circulator 126, to the antenna 139 from which the main carrier is emitted.

Step S107 is followed by step S108 which is implemented to determine whether data reception is being currently requested by at least one of the transponders 103a-103e. This determination is made based on the response data extracted from the response data signal in the signal processing circuit 136 to which the received wave (received by the antenna 139) has been inputted via the circulator 126, LNA 127, received wave filter 128, received wave demodulator 129, first filter 130, amplifier 131 and A/D converter 132.

If the affirmative decision (YES) is obtained in step S108, the control flow goes to step S109. If a negative decision (NO) is obtained in step S108, the control flow goes to step S110.

Step S109 is implemented to receive the response data from the transponder 103. Specifically, the received wave (received by the antenna 139) is inputted to the received wave demodulator 129 via the circulator 126, LNA 127 and received wave filter 128, and the received wave demodulator 129 demodulates the received wave with the main carrier which has been supplied from the main carrier modulator 124 to the received wave demodulator 129. The thus demodulated signal is inputted to the signal processing circuit 136 via the first filter 130, amplifier 131 and A/D converter 132, and the response data is extracted from the response data signal in the signal processing unit 136. After the implementation of step S109, the control flow goes back to step S101 to initiate the next cycle of execution of the data communication routine.

Step S110 is implemented to suspend the transmission of the main carrier. After the implementation of step S110, the control flow goes back to step S101 to initiate the next cycle of execution of the data communication routine.

If the affirmative decision (YES) is obtained in step S101, step S111 is implemented to receive the transmission data from the other interrogator 102b. Specifically, the received wave (received by the antenna 139) is inputted to the received wave demodulator 129 via the circulator 126, LNA 127 and received wave filter 128, and the received wave demodulator 129 demodulates the received wave with the main carrier which has been supplied from the main carrier modulator 124 to the received wave demodulator 129. The thus demodulated signal is inputted to the signal processing circuit 136 via the second filter 133, amplifier 134 and A/D converter 135, and the transmission data is extracted from the transmission data signal in the signal processing unit 136. After the implementation of step S111, the control flow goes back to step S101 to initiate the next cycle of execution of the data communication routine.

As is clear from the above description, in the communication system 101 constructed according to the second embodiment of the invention, the frequency band of the transmission data signal generated by the subcarrier modulator 122 of each of the interrogators 102a, 102b is adapted to be different from the frequency band of the response data signal generated by the subcarrier modulator 152c of each of the transponders 103a-103e. Therefore, there is substantially no risk of interference between the communication wave transmitted from each of the interrogators 102 to the other of the interrogators 102 and the reflected wave transmitted from the transponder 103 in response to the interrogating wave which has been transmitted from the each of the interrogators 2, so that the communication between the interrogators 102 and the communication between the interrogator 102 and transponder 103 can be effected concurrently with each other. Further, since the transmission data signal (that is transmitted from each of the interrogators 2 to the other of the interrogators 2) is modulated with the main carrier wave (that is transmitted from each interrogator 2 to the interrogator 3), each interrogator 2 can be advantageously given a simplified construction.

Further, since the frequency of the transmission data signal is adapted to be higher than that of the response data signal (the frequency of the response data signal is adapted to be lower than that of the transmission data signal), the frequency of the response data signal can be made lower and the amount of consumption of electric energy by each transponder 3 can be made smaller, than where the frequency of the transmission data signal is lower than that of the response data signal (the frequency of the response data signal is adapted to be higher than that of the transmission data signal).

Further, since the emission of the communication wave from each of the interrogators 2 is suspended at least while the communication wave emitted from the other of the interrogators 2 is being received by the each of the interrogators 2, it is possible to prevent interference between the communication wave emitted from each interrogator 2 and the communication emitted from the other interrogator 2.

Third Embodiment

Figure 11:
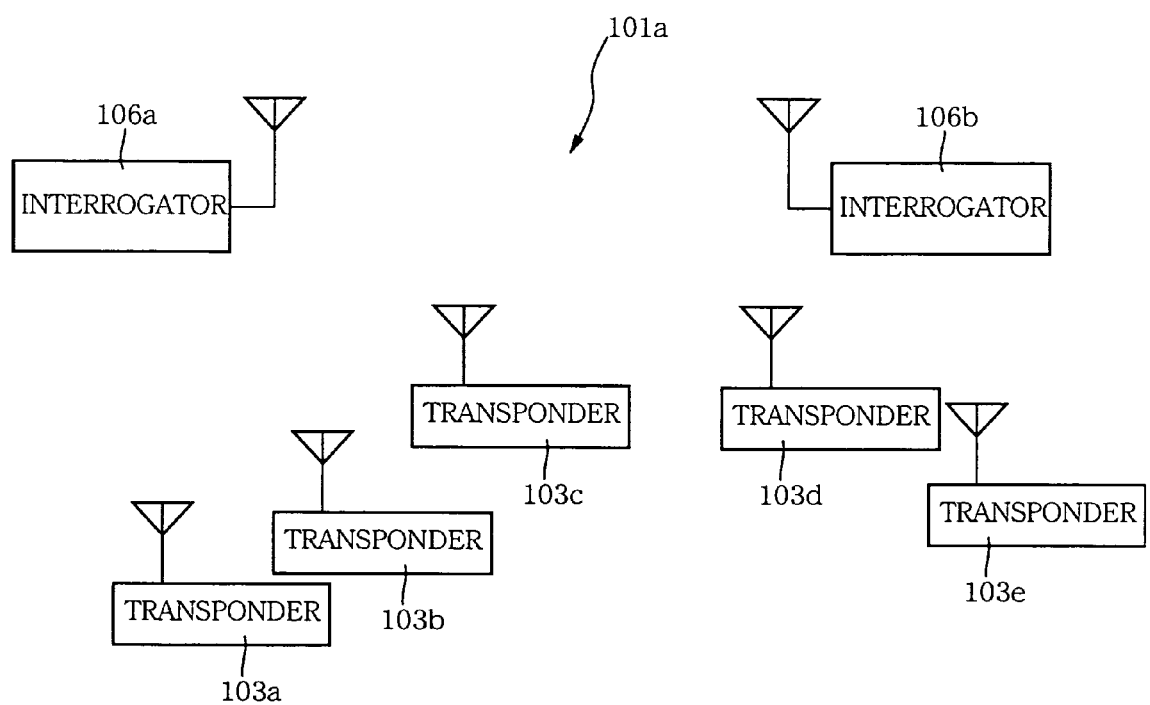
FIG. 11 is a view showing an arrangement of a communication system constructed according to a third embodiment of the invention.

Referring next to FIGS. 11-14, there will be described a communication system 101a constructed according to a third embodiment of the invention. As shown in FIG. 11, this communication system 101a includes two interrogators 106a, 106b (which will be referred simply to as interrogators 106 where they do not have to be distinguished from each other) and three transponders 103a, 103b, 103c, 103d, 103e (which will be referred simply to as transponders 103 where they do not have to be distinguished from each other). Although the communication system 101a shown in FIG. 11 includes the two interrogators 106 and the five transponders 103, the numbers of them may be changed depending upon scale of the communication system and service environment. It is noted that the transponders 103a-103e are identical with those in the second embodiment, and the following description as to the transponders 103a-103e provided in the second embodiment can be applied herein in the present third embodiment.

Figure 12:
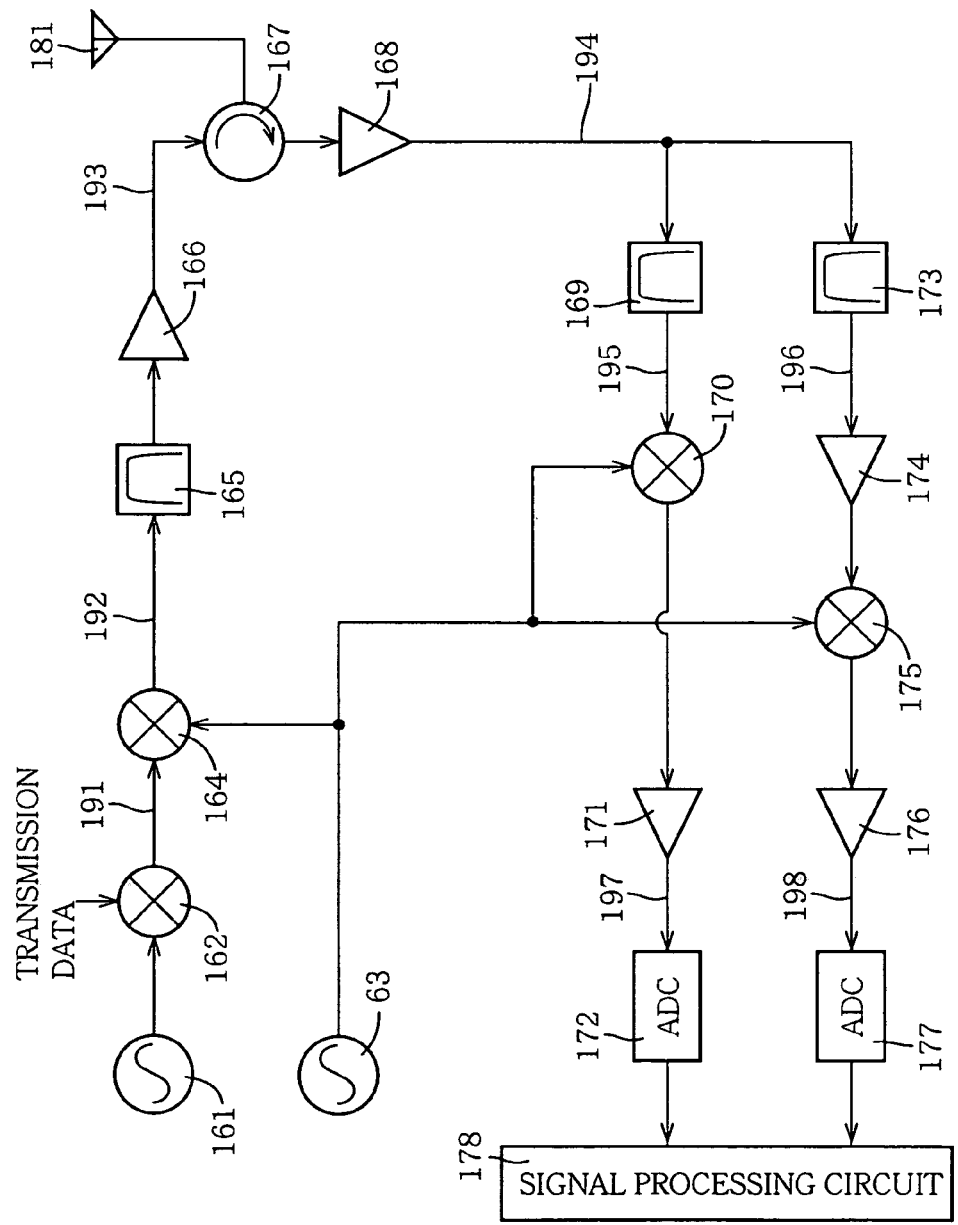
FIG. 12 is a block diagram showing an arrangement of an interrogator included in the communication system of FIG. 11.
Figure 13:
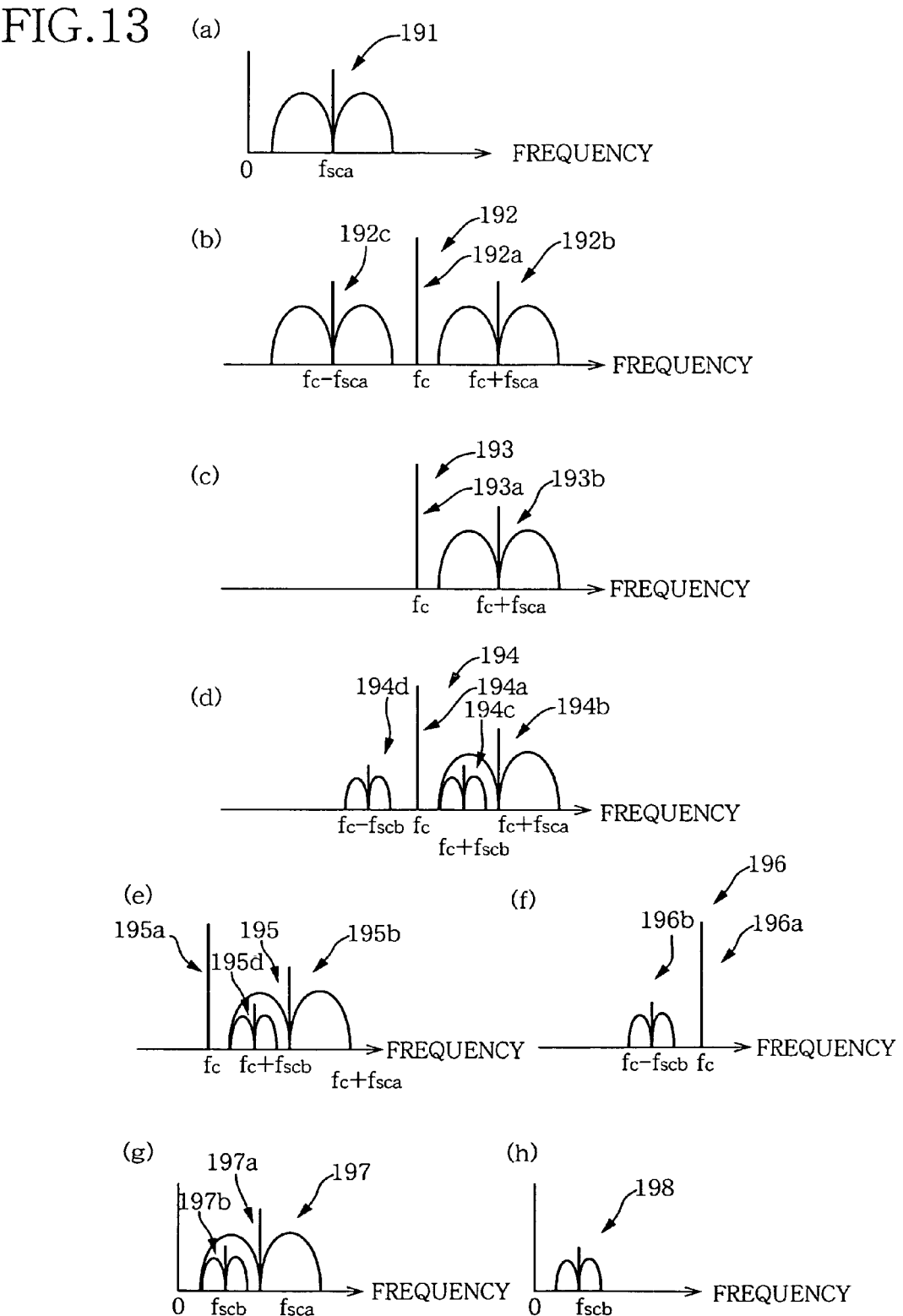
FIG. 13 is a set of views showing outputs of various devices constituting the interrogator of FIG. 12.

Referring to FIGS. 12 and 13, the arrangement of the interrogator 106a will be first described. FIG. 12 is a block diagram showing the arrangement of the interrogator 106a. FIG. 13 is a set of views showing outputs of various devices constituting the interrogator 106a. It is noted that the interrogator 106b is identical in construction with the interrogator 106a, and the following description as to the interrogator 106a can be applied to the interrogator 106b.

As shown in FIG. 12, the interrogator 106a includes a subcarrier oscillator 161, a subcarrier modulator 162, a main carrier oscillator 163, a main carrier modulator 164, a transmission wave filter 165, an amplifier 166, a circulator 167, a low noise amplifier (LNA) 168, a received wave filter 169, a received wave demodulator 170, an amplifier 171, an A/D converter 172, a received wave filter 173, a radio frequency (RF) amplifier 174, a received wave demodulator 175, an amplifier 176, an A/D converter 177, a signal processing circuit 178 and an antenna 181.

The subcarrier oscillator 161 is operable to oscillate or generate a subcarrier having a frequency fsca, and to then output the generated subcarrier to the subcarrier modulator 162. It is noted that a subcarrier oscillator provided in the interrogator 106b is arranged to generate a subcarrier having the same frequency fsca.

The subcarrier modulator 162 is operable to generate the transmission-data-signal modulated wave (transmission data signal), by modulating the subcarrier (supplied from the subcarrier oscillator 161) with the transmission information. Thus generated transmission data signal is inputted to the main carrier modulator 164. This transmission data signal 191, which is outputted from the subcarrier modulator 162, consists of the subcarrier (having the frequency fsca) and sidebands located on respective opposite sides of the subcarrier frequency fsca, as shown in the view (a) of FIG. 13. In the present third embodiment, the subcarrier modulator 162 serves as a transmission data signal generator operable to generate the transmission data signal 191 based on the information that is to be transmitted to the other interrogator 106b.

The main carrier oscillator 163 is operable to oscillate the main carrier having a frequency fc, and to then output the generated main carrier to the main carrier modulator 164 and received wave demodulators 170, 175. It is noted that a main carrier oscillator provided in the interrogator 106b is arranged to generate a main carrier having the same frequency fc.

The main carrier modulator 164 is operable to generate a transmission-data-signal modulated wave, by modulating the main carrier with the transmission data signal. That is, the main carrier modulator 164 generates the transmission-data-signal modulated wave, by modulating the main carrier (which has been supplied from the main carrier oscillator 163), with the transmission data signal (which has been supplied from the subcarrier modulator 162), and then outputs the main carrier and the transmission-data-signal modulated wave, to the transmission wave filter 165. The output 192 of the main carrier modulator 164 contains the main carrier 192a having the frequency fc, an upper sideband 192b located around a frequency fc+fsca, and a lower sideband 192c located around a frequency fc−fsca, as shown in view (b) of FIG. 13. The upper and lower sidebands 192b, 192c are components of the transmission-data-signal modulated wave.

The transmission wave filter 165, which is provided by a band-pass filter, is operable to pass, among the output 192 supplied from the main carrier wave modulator 164, only the main carrier wave 192a and the upper sideband 192b of the transmission-data-signal modulated wave (as one of the components of the transmission-data-signal modulated wave), and to reject the lower sideband 192c of the transmission-data-signal modulated wave (as the other of the components of the transmission-data-signal modulated wave). Thus, the transmission wave filter 165 supplies the main carrier wave 192a and the upper sideband 192b of the transmission-data-signal modulated wave, to the amplifier 166.

The amplifier 166 is operable to electrically amplify the main carrier 192a and the upper sideband 192b of the transmission-data-signal modulated wave which have been supplied from the transmission wave filter 165, and to then output a transmission wave 193 contains the main carrier 192a and the upper sideband 192b of the transmission-data-signal modulated wave which have been amplified. The transmission wave 193 as an output of the amplifier 166 is supplied to the circulator 167. As shown in the view (c) of FIG. 13, this transmission wave 193 contains the main carrier 193a having the frequency fc and the upper sideband 193b of the transmission-data-signal modulated wave located around a frequency fc+fsca.

The circulator 167 is operable to separate an output signal that is to be outputted from the interrogator 106a and an input signal that is to be inputted to the interrogator 106a, from each other. Specifically, the circulator 167 supplies the transmission wave 193 (which has been supplied from the amplifier 166) to the antenna 181, while supplying a received wave (which has been transmitted to the antenna 181) to the LNA 168. The transmission wave is emitted from the antenna 181. The LNA 168 is operable to electrically amplify the received wave supplied from the circulator 167, and to then supply the amplified received wave 194 to the received wave filters 169 and 173. In the present embodiment, the amplifier 166, circulator 167 and antenna 181 cooperate with each other to constitute a transmitter which is operable to transmit the transmission wave containing the main carrier and the transmission-data-signal modulated wave. The antenna 181, circulator 167 and LNA 168 cooperate with each other to constitute a receiver which is operable to receive the reflected wave and the communication wave which have been transmitted from the transponder 103 and the other interrogator 106b.

As shown in the view (d) of FIG. 13, components which can be contained in the received wave 194 as an output of the LNA 168 are: a main carrier 194a having the frequency fc and contained in the communication wave transmitted from the other interrogator 106b; an upper sideband 194b as the component of the transmission-data-signal modulated wave contained in the communication wave transmitted from the other interrogator 106b; and upper and lower sidebands 194c, 194d as components of the reflected wave transmitted from the transponder 103. The upper sideband 194b of the transmission-data-signal modulated wave is located around a frequency fc+fsca. The upper sideband 194c of the reflected wave is located around a frequency fc+fscb and overlaps with the upper sideband 194b of the transmission-data-signal modulated wave, while the lower sideband 194d of the reflected wave is located around a frequency fc−fscb.

The frequency fsca of the subcarrier oscillated by the subcarrier oscillator 161 of each interrogator 106 and the frequency fsca of the subcarrier oscillated by the subcarrier oscillator 152b of each transponder 103 are set to such values that cause the upper sideband 194b of the transmission-data-signal modulated wave and the upper sideband 194c of the reflected wave to overlap with each other. Further, the intensity of the main carrier generated by the main carrier oscillator 163 is set to such a value that avoids the transmission-data-signal modulated wave from being interfered by the reflected wave (which overlaps at its upper sideband 194c with the upper sideband 194b of the transmission-data-signal modulated wave), so that the transmission data can be extracted from the transmission-data-signal modulated wave.

The set value of the intensity of the main carrier is large enough to enable each interrogator 106 to detect the reflected wave transmitted from one of the transponders 103 that is the most distant from the each interrogator 106, and is small enough to prevent the demodulation of the communication wave from being interfered by the reflected wave transmitted from one of the transponders 103 that is the closest to the each interrogator 106. In general, the value of the intensity of the main carrier is determined by taking account of a predetermined communication speed, a predetermined level of capacity for error correction and an employed modulation system, such that the intensity of the reflected wave (transmitted from the closest one of the transponders 103) is smaller than that of the communication wave by about 10-20 dB. However, the communication speed, level of error correction capacity and modulation system may be determined such that the demodulation of the communication wave is not interfered by the reflected wave, after the difference between the intensities of the communication wave and the reflected wave have been set. Further, it is possible to determine a limited range within which the distance between each interrogator 106 and the closest transponder 103 should be lie, for avoiding the interference.

In the present third embodiment, since the reflected wave transmitted from the transponder 103 and the communication wave transmitted from the other interrogator 106 are in a so-called trade-off relationship, the intensity of the main carrier may vary depending upon which one of the receptions of the respective reflected and communication waves is more important than the other. Where an accuracy of the reception of the reflected wave is regarded as more important, the intensity of the main carrier may be set to be relatively high. Where an accuracy of the reception of the communication wave is regarded as more important, the intensity of the main carrier may be set to be relatively low.

There might be a case where there are differences among the transponders 103, with respect to performance in the generation of the reflected wave. In such a case, the value of the intensity of the main carrier may be set to be large enough to enable each interrogator 106 to detect the reflected wave transmitted from the most distant transponder 103 even where the reflected wave generated by the most distant transponder 103 has the lowest intensity, and to be small enough to prevent the demodulation of the communication wave from being interfered by the reflected wave transmitted from the closest transponder 103 even where the reflected wave generated by the closest transponder 103 has the highest intensity.

The received wave filter 169 serves as a second reception filter operable to pass, among the waves received by the above-described receiver, the communication wave which has been transmitted from the other interrogator 106b. The received wave filter 169 is provided by a band-pass filter arranged to pass the communication wave among the amplified received wave 194 supplied from the LNA 168, and to then output the communication wave to the received wave demodulator 170. The output 195 of the received wave filter 169 contains: a main carrier 195a having the frequency fc and contained in the communication wave transmitted from the other interrogator 106b; an upper sideband 195b as the component of the transmission-data-signal modulated wave contained in the communication wave transmitted from the other interrogator 106b; and an upper sideband 195d as a component of the reflected wave transmitted from the transponder 103, as shown in the view (e) of FIG. 13. The upper sideband 195b of the transmission-data-signal modulated wave is located around a frequency fc+fsca. The upper sideband 195d of the reflected wave is located around a frequency fc+fscb and overlaps with the upper sideband 195b of the transmission-data-signal modulated wave. Although the output 195 of the received wave filter 169 contains also the signal 195d as the component of the reflected wave transmitted from the transponder 103, the received wave filter 169 may be regarded to pass exclusively the communication wave, since the intensity of the main carrier is set to such a value that avoids the interference to the communication wave by the reflected wave.

The received wave demodulator 170 is operable to demodulate the communication wave which has passed through the received wave filter 169, with the main carrier supplied from the main carrier oscillator 163, and to then output the demodulated signal to the amplifier 171.

The amplifier 171 is operable to electrically amplify the signal outputted from the received wave modulator 170, and to then output the amplified signal to the A/D converter 172. The output 197 of the amplifier 171 contains a transmission data signal 197a located around the frequency fsca and a response data signal 197b located around the frequency fscb, as shown in the view (g) of FIG. 13. It is noted that only the transmission data signal 197a can be extracted from the output 197, since the intensity of the main carrier is set such that the communication wave is not interfered by the reflected wave, for example, by adjusting gain of the amplifier 166 which cooperates with the main carrier oscillator 163 to constitute a main carrier wave generator.

The A/D converter 172 is operable to convert the amplified signal as an analog signal which has been outputted from the amplifier 171, into a digital signal, and to then output the digitalized signal to the signal processing circuit 178.

The received wave filter 173 serves as a first reception filter operable to pass, among the waves received by the above-described receiver, only the reflected wave which has been transmitted from the transponder 103. The received wave filter 173 is provided by a band-pass filter arranged to pass only the reflected wave among the amplified received wave supplied from the LNA 168, and to then output the reflected wave to the RF amplifier 174. The output 196 of the received wave filter 173 contains: a main carrier 196a having the frequency fc and contained in the communication wave transmitted from the other interrogator 106b; and a lower sideband 196b as a component of the reflected wave transmitted from the transponder 103 and located around the frequency fc−fscb, as shown in the view (f) of FIG. 13.

The RF amplifier 174 is operable to electrically amplify the reflected wave having passed through the received wave filter 173, and to then output the amplified reflected wave to the received wave demodulator 175.

The received wave demodulator 175 is operable to demodulate the amplified reflected wave outputted from the RF amplifier 174, with the main carrier or communication wave outputted from the main carrier oscillator 163, and to then output the demodulated signal (response data signal transmitted from the transponder 3), to the amplifier 176.

The amplifier 176 is operable to electrically amplify the demodulated signal outputted from the received wave demodulator 175, and to then output the amplified signal to the A/D converter 177. The output 198 of the amplifier 176 contains the response data signal located around the frequency fscb as shown in the view (h) of FIG. 13.

The A/D converter 177 is operable to convert the signal as an analog signal which has been outputted from the amplifier 176, into a digital signal, and to then output the digitalized signal to the signal processing circuit 178.

The signal processing circuit 178 is arranged to extract only the transmission data from the digitalized transmission data signal which has been outputted from the A/D converter 172, and to extract the response data from the digitalized response data signal which has been outputted from the A/D converter 177. In this instance, the response data can not be extracted from the response data signal contained in the output of the A/D converter 172, since the intensity of the response data signal is too low. The extracted response data and transmission data are subjected to predetermined procedures in the signal processing circuit 178.

Figure 14:
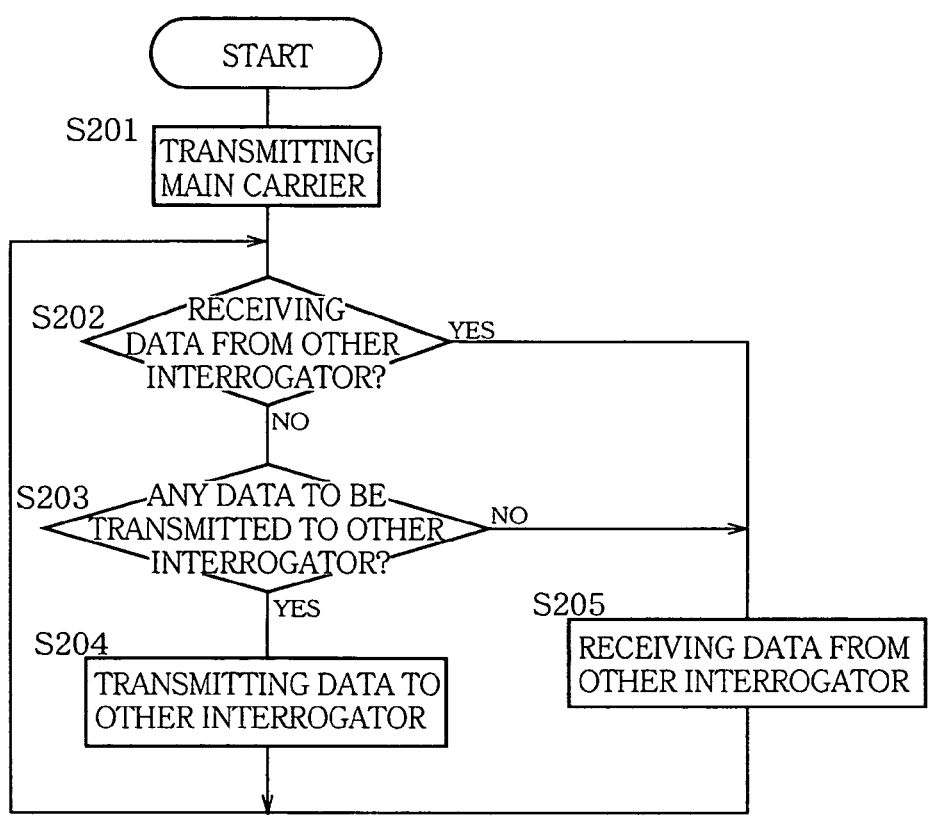
FIG. 14 is a flow chart illustrating a data communication routine executed by the interrogator of FIG. 12.

Referring next to the flow chart of FIG. 14, there will be described a data communication routine executed by the interrogator 106a of the communication system 101a constructed according to the present third embodiment of the invention. It is noted that a data communication routine executed by the interrogator 106b is substantially identical with the routine executed by the interrogator 106a, and the following description of the routine executed by the interrogator 106a can be applied to that executed by the interrogator 106b.

The data communication routine is initiated with step S201 which is implemented to constantly emit the main carrier, and to receive the response data transmitted from any one of the transponders 103 each time the response data is transmitted to the interrogator 106a.

Specifically, a switching element disposed between the subcarrier oscillator 161 and the subcarrier modulator 162 is placed in its OFF state, so that the subcarrier is not inputted to the subcarrier modulator 162 from the subcarrier oscillator 161. Meanwhile, the main carrier oscillated by the main carrier oscillator 163 is supplied to the antenna 181 via the main carrier modulator 164, transmission wave filter 165, amplifier 166 and circulator 167, so that the main carrier is emitted from the antenna 181.

When the wave are received by the antenna 181, the received wave is inputted to the received wave demodulator 175 via the circulator 167, LNA 168, received wave filter 173 and RF amplifier 174, so that the received wave demodulator 175 demodulates the received wave with the main carrier supplied from the main carrier oscillator 163. The demodulated signal is inputted to the signal processing circuit 178 via the amplifier 176 and A/D converter 177, so that the response data is extracted from the response data signal in the signal processing circuit 178. Then, step S201 is followed by step S202.

Step S202 is implemented by the communication wave reception determiner, to determine whether the transmission data transmitted from the other interrogator 106b is being currently received by the interrogator 106a or not. Specifically, the received wave received by the antenna 181 is inputted to the received wave demodulator 170 via the circulator 167, LNA 168 and received wave filter 169, so that the received wave demodulator 170 demodulates the received wave with the main carrier supplied from the main carrier oscillator 163. The demodulated signal is inputted to the signal processing circuit 178 via the amplifier 171 and A/D converter 172, so that it is determined whether or not the transmission data is contained in the signal inputted to the signal processing circuit 178.

If an affirmative decision (YES) is obtained in step S201, the control flow goes to step S205. If a negative decision (NO) is obtained in step S201, the control flow goes to step S203.

Step S203 is implemented to determine whether there is any data to be transmitted to the other interrogator 106b. If an affirmative decision (YES) is obtained in step S203, the control flow goes to step S204. If a negative decision (NO) is obtained in step S203, the control flow goes to step S205.

Step S204 is implemented to transmit the transmission data to the other interrogator 106b. Specifically, the subcarrier modulator 162 generates the transmission data signal, by modulating the subcarrier (supplied from the subcarrier oscillator 161), with the transmission data. Then, the main carrier modulator 164 modulates the transmission-data-signal modulated wave, by modulating the main carrier (supplied from the main carrier oscillator 163), with the generated transmission data signal. Then, among the main carrier and the generated transmission-data-signal modulated wave, the main carrier and the upper sideband of the transmission-data-signal modulated wave are allowed by the transmission wave filter 165 to pass therethrough, and are inputted to the amplifier 166 so as to be amplified. Then, the transmission wave containing the amplified main carrier and the amplified upper sideband of the transmission-data-signal modulated wave is supplied to the antenna 181 via the circulator 167, so as to be transmitted from the antenna 181. After the implementation of step S204, the control flow goes back to step S202.

Step S205 is implemented to suspend the transmission of the communication wave from the interrogator 106a, (for example, by controlling the transmitter,) while receiving the transmission data from the other interrogator 106b. Specifically, the received wave (received by the antenna 181) is inputted to the received wave demodulator 170 via the circulator 167, LNA 168 and received wave filter 169, and the received wave demodulator 170 demodulates the received wave with the main carrier which has been supplied from the main carrier oscillator 163 to the received wave demodulator 170. The thus demodulated signal is inputted to the signal processing circuit 178 via the amplifier 171 and A/D converter 172, and the transmission data is extracted from the transmission data signal in the signal processing circuit 178. After the implementation of step S205, the control flow goes back to step S202.

As is clear from the above description, in the communication system 101a constructed according to the third embodiment of the invention, the communication wave transmitted from each of the interrogators 106a, 106b to the other of the interrogators 106a, 106b is adapted to contain only the main carrier and one of the sidebands of the transmission-data-signal modulated wave, so that the transmission of the interrogating wave and the transmission of the communication wave can be made concurrently with each other. Further, since the transmission data signal (that is transmitted from the interrogator to the other interrogator) is modulated with the main carrier wave (that is transmitted from the interrogator to the transponder), the interrogator can be advantageously given a simplified construction.

Further, the intensity of the main carrier generated by the main carrier oscillator 163 is set to the value that avoids the transmission-data-signal modulated wave from being interfered by the reflected wave which overlaps at its upper sideband 194c with the upper sideband 194b of the transmission-data-signal modulated wave. This arrangement makes it possible to lower the frequency of the subcarrier oscillated by the subcarrier oscillator 161 of each of the interrogators 106a, 106b and the frequency of the subcarrier oscillated by the subcarrier oscillator 152b of each of the transponders 103a-103e, and accordingly to reduce the amount of consumption of electric energy by the interrogators 106 and the transponders 103.

Further, since the emission of the communication wave from each of the interrogators 106 is suspended at least while the communication wave emitted from the other of the interrogators 106 is being received by the each of the interrogators 106, it is possible to prevent interference between the communication wave emitted from each interrogator 106 and the communication emitted from the other interrogator 106.

Fourth Embodiment

Referring next to FIGS. 16-21, there will be described a communication system 201 constructed according to a fourth embodiment of the invention. It is noted that the communication system 201 of the present fourth embodiment of the invention is a specified example of the above-described communication system 1 of the first embodiment. In the following description of the fourth embodiment, the same reference signs as used in the above-described first embodiment will be used to identify the functionally corresponding elements.

Figure 16:
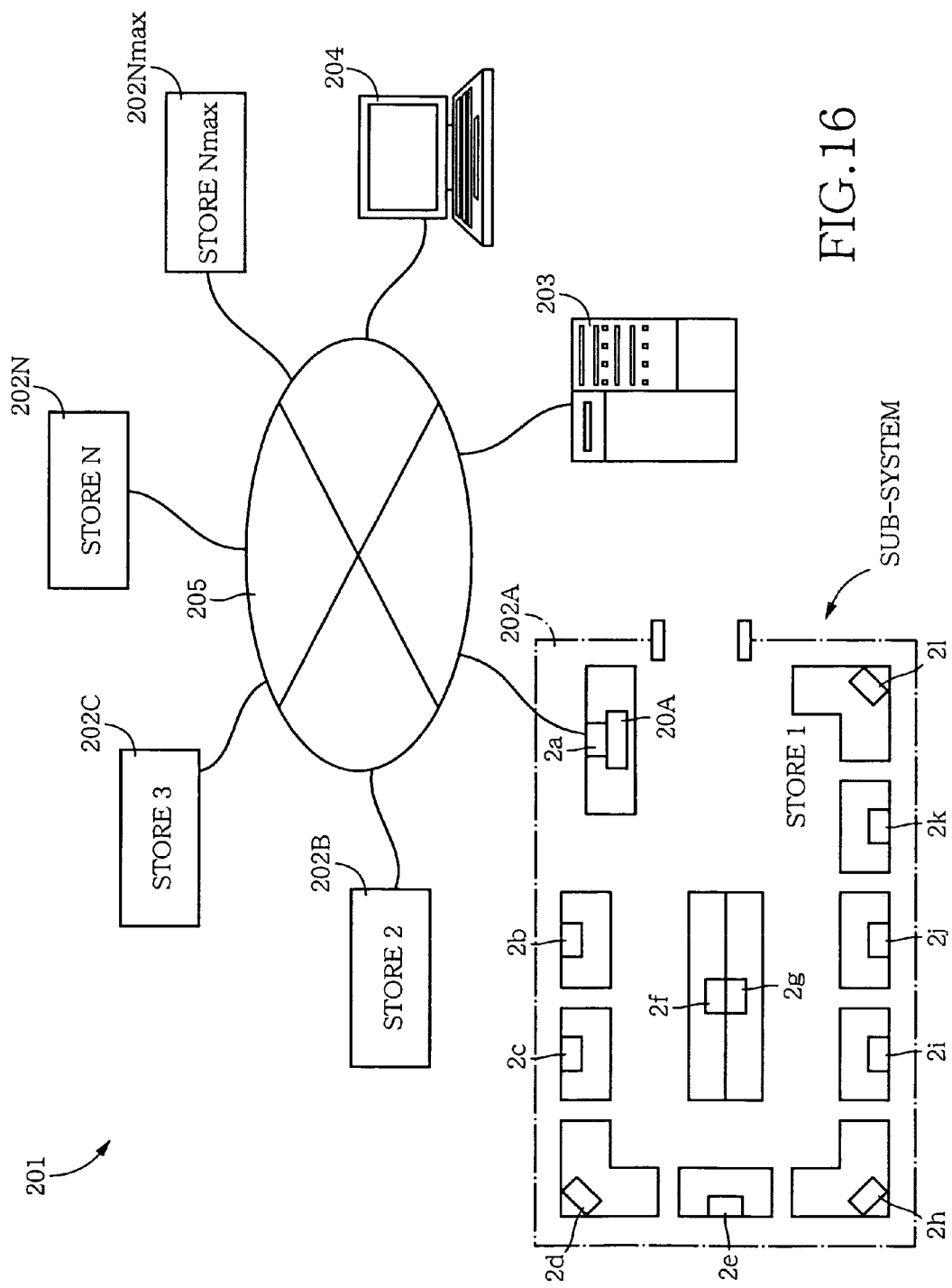
FIG. 16 is a view showing an arrangement of a communication system constructed according to a fourth embodiment of the invention.

As shown in FIG. 16, this communication system 201 includes a plurality of sub-systems, an administrative sever 203, a terminal unit 204 and a network 205 as a wire or wireless communication line. The plurality of sub-systems are installed in respective commercial stores 202A, 202B, 202C, . . . , 202N, . . . , 202Nmax (which will be referred simply to as commercial stores 202 where they do not have to be distinguished from each other), and each of the sub-systems includes twelve interrogators 2a, 2b, 2c, 2d, 2e, 2f, 2g, 2h, 2i, 2j, 2k, 2l and three interrogators 3a, 3b, 3c. The network 205 connects the administrative server 203, terminal unit 204 and at least one (e.g., interrogator 2a) of the twelve interrogators 2a-2l of each sub-system, so that a data communication can be effected among those connected via the network 205.

For example, each commercial store 202 such as a supermarket and a convenience store, in which customers can walk while looking at merchandises displayed in a plurality of sections, is provided with the sub-system which is substantially identical with the communication system 1 of the first embodiment (except for the interrogators 2f-2l which are additionally included in the sub-system), so that the communication between the interrogators 2 and also the communication between each of the interrogators 2 and any one of the transponders 3 can be effected. In the present fourth embodiment, the transponders 3 may be built in the merchandise stocked in the store 202, or built in cards (such as member cards and customer reward cards) carried by the customers. It is noted that only the interrogators 2a-2i of the sub-system installed in the store 202A are shown in FIG. 16, while the transponders 3a-3c are not shown in FIG. 16. It is also noted that the numbers of the interrogators 2 and transponders 3 may be changed depending upon scale of the communication system and service environment, as in the communication system 1 of the first embodiment.

Figure 17:
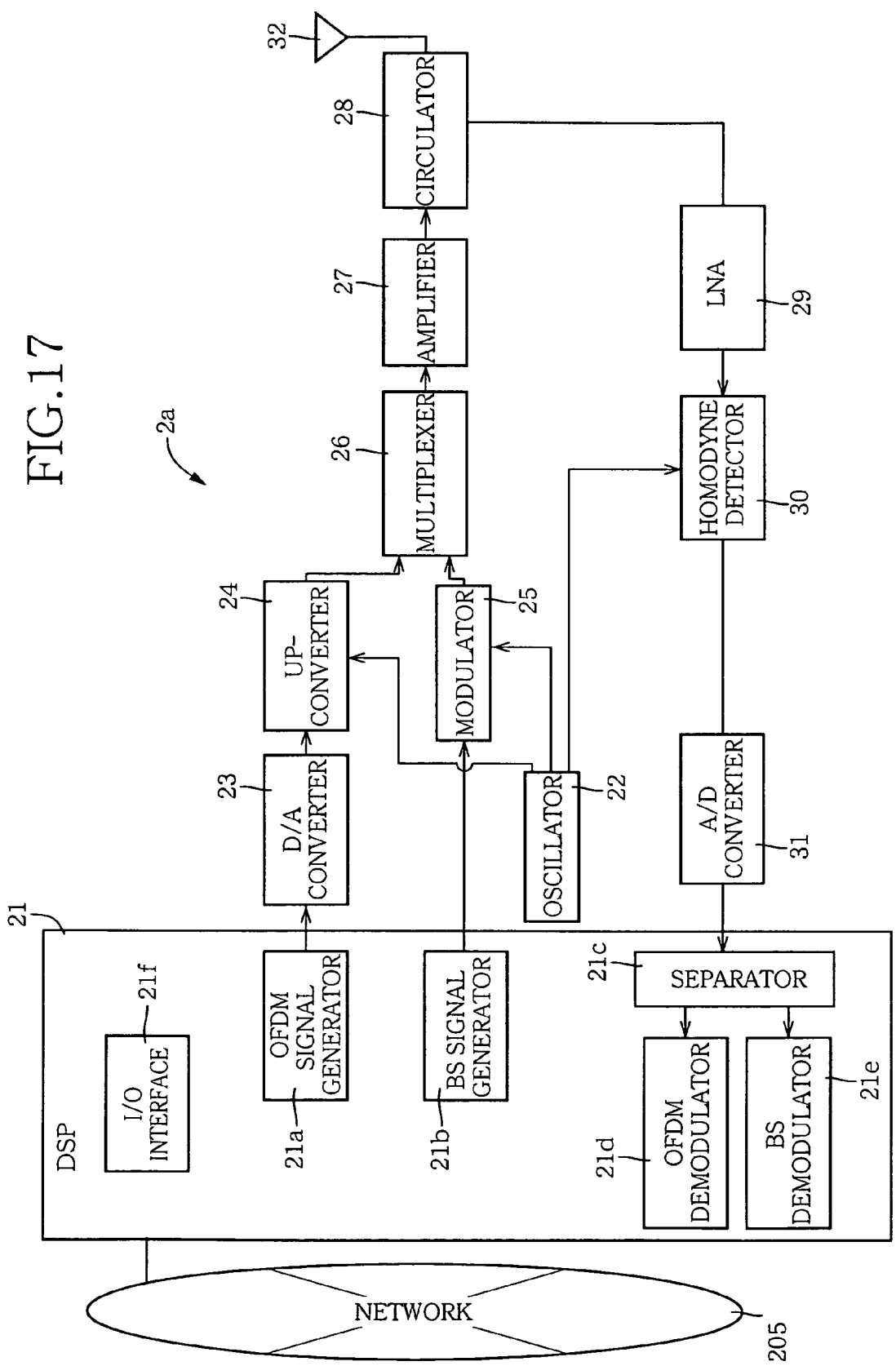
FIG. 17 is a block diagram showing an arrangement of an interrogator included in the communication system of FIG. 16.
Figure 18:
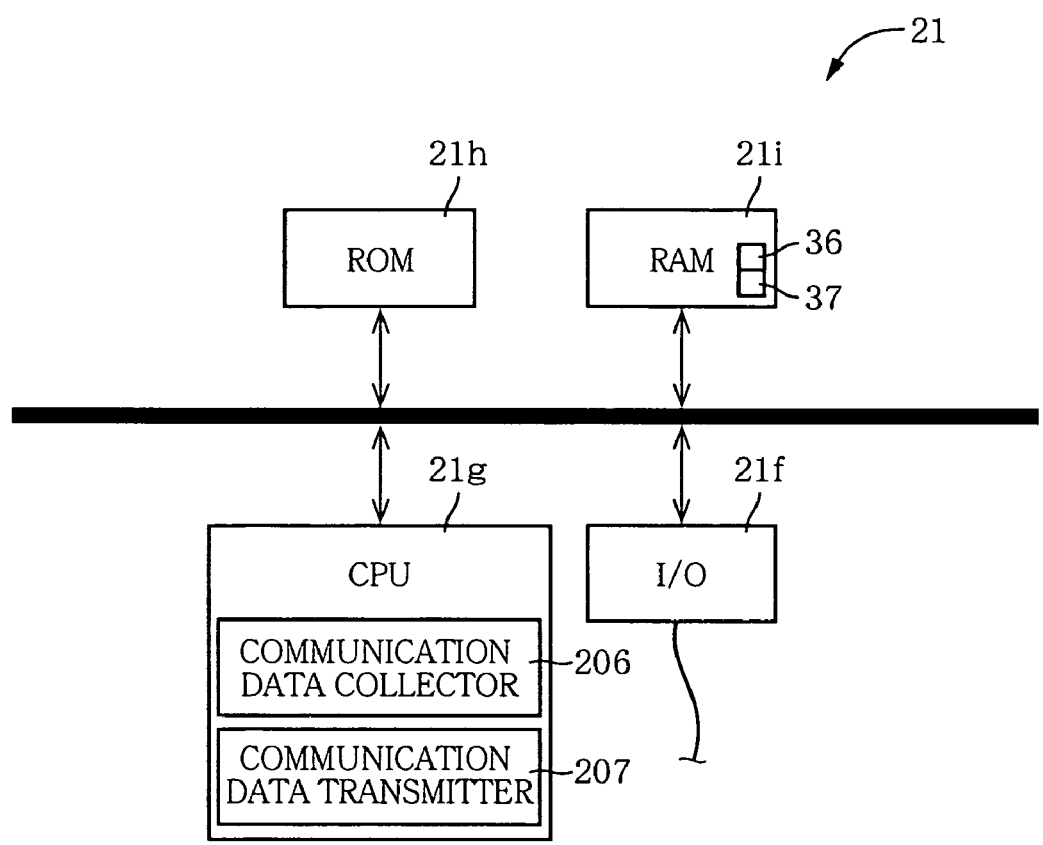
FIG. 18 is a block diagram showing DSP included in the interrogator of FIG. 17.

Referring to FIGS. 17 and 18, the arrangement of the interrogator 2a will be described. FIG. 17 is a block diagram showing the arrangement of the interrogator 2a, while FIG. 18 is a block diagram showing the DSP 21 included in the interrogator 2a of FIG. 17. It is noted that the other interrogators 2b-2i and the transponders 3a-3c are identical in construction with those of the communication system 1 of the first embodiment, and the foregoing description can be applied to the other interrogators 2b-2i and the transponders 3a-3c of the present fourth embodiment.

As shown in FIG. 18, the DSP 21 of the interrogator 2a includes a central processing unit (CPU) 21g, a read only memory (ROM) 21h and a random access memory (RAM)

21*i*, and effects signal processing operations according to control programs stored in the ROM 21*h*, while utilizing a temporary data storage function of the RAM 21*i*, for executing various control routines. The DSP 21 further includes an input/output (I/O) interface 21*f* as shown in FIGS. 17 and 18, through which the DSP 21 is connected to the network 205, so that the data communication among the administrative server 203, terminal unit 204 and interrogator 2*a* of each store 202 can be effected. The interrogator 2*a* is provided in a register 20A which is placed on a pathway connecting inside and outside the store 202, as shown in FIG. 16. A communication data collector 206 and a communication data transmitter 207 are control facilities provided in the CPU 21*g*, although each of them may be provided by a hardware which is formed independently of the CPU 21*g*.

The communication data collector 206 is operable to collect data related to communication effected between the interrogators 2*a*-2*i* (including the interrogator 2*a*) and data related to communication effected between each of the interrogators 2*a*-2*i* and any one of the transponder 3*a*-3*c*, by sequentially interrogating the other interrogators 2*b*-2*i* which are located to be adjacent to the interrogator 2*a* in the sub-system provided in the store 202. The data related to the communications include: a data element representative of the number of customers having visited each store 202 for a predetermined length of time; a data element representative of the number of customers having visited each section of the store 202 for a predetermined length of time; a data element representative of the sales amount in each section of the store 202 for a predetermined length of time; a data element representative of movement path of each customer in the store 202; a data element representative of a length of time for which each customer has stayed in each section of the store 202; and other data elements representative of other data related to the store 202.

Preferably, a data-transmission command signal is transferred from the communication data collector 206 of the interrogator 2*a* to the interrogator 2*b* (adjacent to the interrogator 2*a*), and the data-transmission command signal is then transferred from the interrogator 2*b* to the interrogator 2*c* (adjacent to the interrogator 2*b*), then from the interrogator 2*c* to the interrogator 2*d* (adjacent to the interrogator 2*c*). Thus, the data-transmission command signal is transferred sequentially from the interrogator 2*a* to the last interrogator 21. After the data-transmission command signal has been transferred to the last interrogator 21, the detected store-related data is transferred from the last interrogator 2*l* to the interrogator 2*k* (adjacent to the interrogator 2*l*), then from the interrogator 2*k* to the interrogator 2*j* (adjacent to the interrogator 2*k*). Thus, the detected store-related data is transferred sequentially from the interrogator 2*l* to the last interrogator 2*a*. While the store-related data is being relayed from the interrogator 2*l* toward the interrogator 2*a*, data detected by each of the interrogators 2 is added to the relayed store-related data. That is, each interrogator 2 adds the detected data to the store-related data, and then transfers the store-related data to the next interrogator 2.

The store-related data (related to the store 202) is efficiently collected by the communication data collector 206 of the interrogator 2*a*, and the collected data is stored in the buffers 36, 37 of the RAM 21*i* included in the DSP 21. The communication data transmitter 207 is operable to transmit the data (collected by the communication data collector 206 and stored in the buffers 36, 37), to the administrative server 203 via the network 205.

Figure 19:
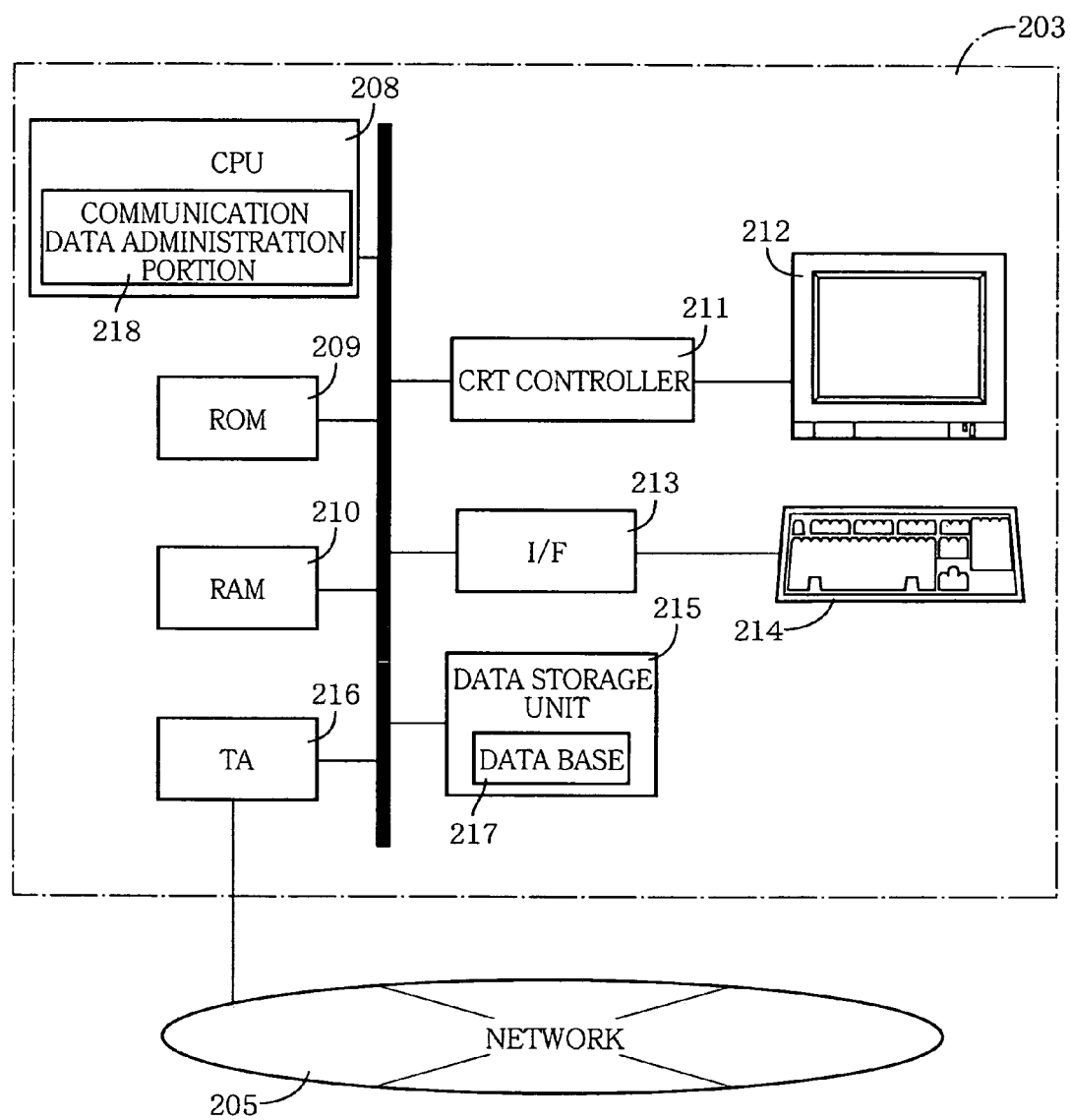
FIG. 19 is a view showing an arrangement of an administrative server included in the communication system of FIG. 16.

FIG. 19 is a block diagram showing an electric arrangement of the administrative server 203. As shown in FIG. 19, the administrative server 203 includes a central processing unit (CPU) 202, a read only memory (ROM) 209 and a random access memory (RAM) 210, and effects signal processing operations according to control programs stored in the ROM 209, while utilizing a temporary data storage function of the RAM 210, for executing various control routines. The administrative server 203 further includes a CRT controller 211, a display device 212 (e.g., CRT) controlled by the CRT controller 211, an interface 213, a keyboard 214 as an input device connected to the interface 213, a data storage unit 215 (e.g., hard disk), and a terminal adaptor (TA) 216 through which the CPU 208 and other elements included in the administrative server 203 are connected to the network 205. The data storage unit 215 includes a database 217 which stores the data related to each of the stores 202 such that the data is sorted into groups corresponding to the respective stores 202 or sorted into groups corresponding to the respective interrogators 2. It is noted that the terminal unit 204 serves to an operation terminal of the administrative server 203 to which the terminal unit 204 is connected via the network 205, so that the administrative server 203 is operable also through the terminal unit 204.

The administrative server 203 includes a communication data administration portion 218 which receives the data transmitted from the interrogator 2*a* of each of the sub-systems via the network 205, and which administrates the received data in a unified manner. Thus, the administrative server 203 is arranged to receive the store-related data related to each store 202 (which data has been collected by the communication data collector 206 of the corresponding interrogator 2*a* and then transmitted from the communication data transmitter 207 of the corresponding interrogator 2*a*), and to then sort the received data into a plurality of groups corresponding to the respective stores 202 and sort the data of each of the plurality of groups into a plurality of sub-groups corresponding to the respective sections of a corresponding one of the stores 202. After the sorting of the received data, the data of each of the groups and the data of each of the sub-groups are summed up, and then stored in the database 217 included in the data storage unit 215. It is noted that the communication data administration portion 218 is provided in the CPU 208, as shown in FIG. 19, although it may be provided by a hardware which is formed independently of the CPU 208.

Figure 20:
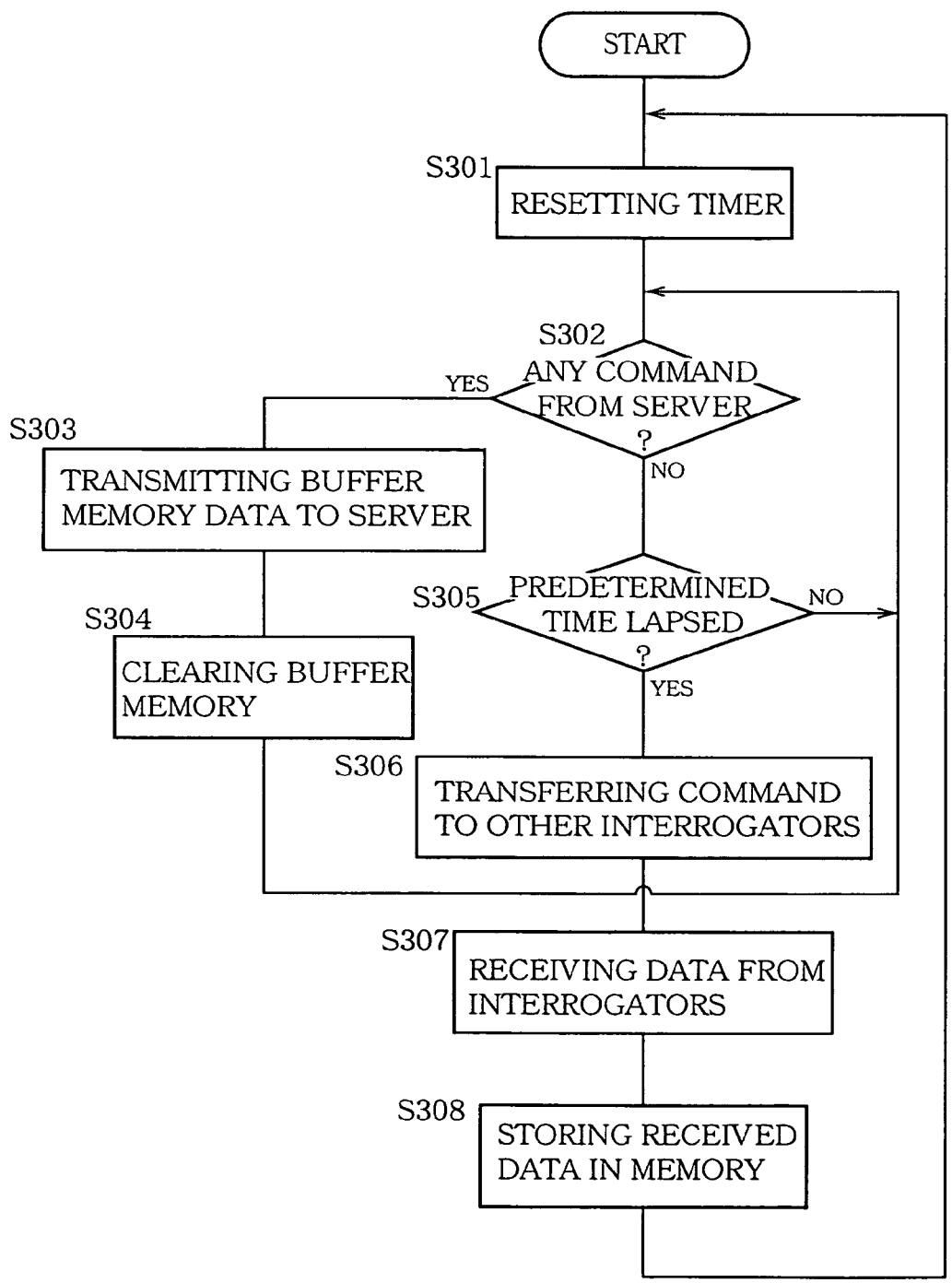
FIG. 20 is a flow chart illustrating a data communication routine executed by the interrogator of FIG. 17.

Referring next to the flow chart of FIG. 20, there will be described a data communication routine executed by the interrogator 2*a* of each of the sub-systems of the communication system 201.

The data communication routine is initiated with step S301 which is implemented to reset (initialize) an internal timer. Step S301 is followed by step S302 which is implemented to determine whether there is any data-transmission command signal commanding transmission of the data related to communication effected between the interrogators 2 and communication effected between each of the interrogators 2 and any one of the transponders 3, which data may be provided by the store-related data including: the data element representative of the number of customers having visited each store 202 for a predetermined length of time; the data element representative of the number of customers having visited each section of the store 202 for a predetermined length of time; the data element representative of the sales amount in each section of the store 202 for a predetermined length of time; the data element representative of movement path of each customer in the store 202; and the data element representative of a length of time for which each customer has stayed in each section of the store 202. If it is determined in step S302 that there is the data-transmission command signal commanding the transmission of the data to the administrative server 203, namely, if an affirmative decision (YES) is obtained in step S302, the control flow goes to step S303. If a negative decision (NO) is obtained in step S302, the control flow goes to step S305.

Step S303 is implemented by the communication data transmitter 207, to transmit the data related to each store 202, i.e., the buffer memory data stored in the buffers 36, 37 of the RAM 21*i* included in the DSP 21, to the administrative server 203.

Step S303 is followed by step S304 which is implemented to clear (initialize) the data stored in the buffers 36, 37. After the implementation of step S304, the control flow goes back to step S302.

Step S305 is implemented to determine whether a predetermined length of time counted by the internal timer has lapsed. If an affirmative decision (YES) is obtained in step S305, the control flow goes to step S306. If a negative decision (NO) is obtained in step S305, the control flow goes back to step S302.

Step S306 is implemented by the communication data collector 206, to transfer the data-transmission command signal to the other interrogators 2*b*-2*i*, for collecting the store-related data related to the store 202.

Step S306 is followed by step S307 which is implemented by the communication data collector 206 to receive the store-related data transferred from the other interrogators 2*b*-2*i*.

Step S307 is followed by step S308 which is implemented by the communication data collector 206 to add or store the received data in the buffers 36, 37. After the implementation of step S308, the control flow goes back to step S301 to initiate the next cycle of execution of the data communication routine.

Figure 21:
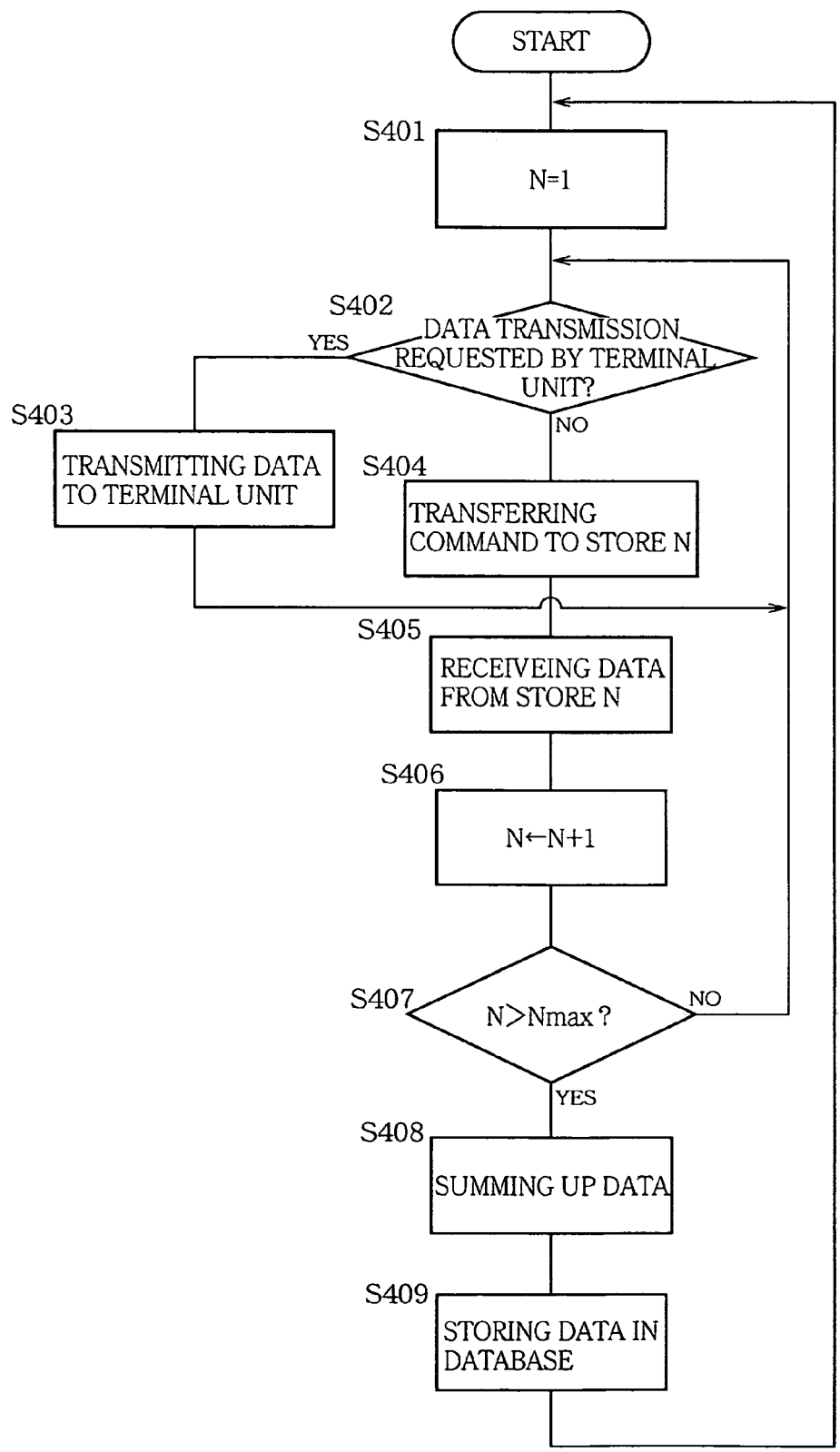
FIG. 21 is a flow chart illustrating a data processing routine executed by the administrative server of FIG. 19.

Referring next to the flow chart of FIG. 21, there will be described a data processing routine executed by the CPU 208 of the administrative server 203.

The data communication routine is initiated with step S401 which is implemented to initialize a value N, namely, to set the value N to "1" (one).

Step S401 is followed by step S402 which is implemented to determine whether transmission of the summed data is being requested by the terminal unit 204. If an affirmative decision (YES) is obtained in step S402, the control flow goes to step S403. If a negative decision (NO) is obtained in step S402, the control flow goes to step S404.

Step S403 is implemented to read out, from the database 217 provided in the data storage unit 215, the summed data corresponding to the request made by the terminal unit 204, and to then transmit the data to the terminal unit 204. After the implementation of step S403, the control flow goes back to step S402.

Step S404 is implemented to transfer the data-transmission command signal to the interrogator 2*a* of the sub-system installed in the store N, for collecting the data related to communication effected in the sub-system installed in the store N, which data is the store-related data including: the data element representative of the number of customers having visited the store N for a predetermined length of time; the data element representative of the number of customers having visited each section of the store N for a predetermined length of time; the data element representative of the sales amount in each section of the store N for a predetermined length of time; the data element representative of movement path of each customer in the store N; and the data element representative of a length of time for which each customer has stayed in each section of the store N.

Step S404 is followed by step S405 which is implemented to receive the store-related data transmitted from the interrogator 2*a* of the sub-system installed in the store N.

Step S405 is followed by step S406 which is implemented to add "1" (one) to the value N.

Step S406 is followed by step S407 which is implemented to determine whether the current value N is lager than Nmax which is the total number of the stores 202. If an affirmative decision (YES) is obtained in step S407, the control flow goes to step S408. If a negative decision (NO) is obtained in step S407, the control flow goes back to step S402.

Step S408 is implemented to sort the store-related data related to the store N (which data has been received in step S404) into the plurality of sub-groups corresponding to the respective sections of the store N. After the sorting of the data related to the store N, the data of each of the sub-groups is summed up.

Step S408 is followed by step S409 which is implemented to store the summed data related to the store N, in the database 217 provided in the data storage unit 215. After the implementation of step S409, the control flow goes back to step S401 to initiate the next cycle of execution of the data communication routine. It is noted that the above-described steps S401-S409 are implemented by the communication data administration portion 218 of the CPU 208.

As is clear from the above description, in the communication system 201 constructed according to the fourth embodiment of the invention, at least one of the plurality of interrogators 2 of each sub-system is connected to the administrative server 203 via the network 205, such that the data communication can be effected between the at least one of the interrogators 2 and the administrative server 203, whereby the data sent from the at least one of the interrogators 2 connected to the network 205 can be supervised or administrated by the administrative server 203. Any one of the communication systems 1, 101, 101*a* of the above-described first through third embodiments of the invention may provide each of the above-described sub-systems of the communication system 201, so as to be administrated in a unified manner. Further, even if the network 205 is provided by a wire communication line, wiring is minimized by the arrangement in which only one (i.e., interrogator 2*a*) of the interrogators 2 is connected to the network 205, whereby deterioration in appearance of the store can be avoided.

Further, the interrogator 2*a* connected to the administrative server 203 includes the communication data transmitter 207 operable to transmit the data related to the communication between any two of the interrogators 2 and the data relating to the communication between each of the interrogators 2 and any one of the transponders 3, to the administrative server 203 via the network 205, wherein the administrative server 203 includes the communication data administration portion 218 operable to administrate, in a unified manner, the set of data transmitted from the interrogator 2*a* connected to the network 205. In this arrangement, the set of data is transmittable from the interrogator 2*a* (connected to the network 205) of each of the sub-systems to the administrative server 203, whereby the plurality of sub-systems of the communication system can be supervised or administrated in a unified manner by the administrative server 203.

Further, the interrogator 2*a* connected to the administrative server 203 includes: the communication data collector 206 operable to collect the data related to the communication between any two of the interrogators 2 and the data relating to the communication between each of the interrogators 2 and any one of the transponders 3, by sequentially interrogating the other interrogators 2*b*-2*l* adjacent to the interrogator 2*a*;

and the communication data transmitter 207 operable to transmit the set of data collected by the communication data collector 206, to the administrative server 203 via the network 205. This arrangement enables the data related to the communication effected in each of the sub-systems can be efficiently collected by the interrogator 2a of each of the sub-systems.

Still further, the plurality of interrogators 2a-2l are placed in each of the plurality of stores 202, wherein the set of data transmitted from the interrogator 2a include the data related to each of the stores 202 in which the interrogators 2a-2l are placed. This arrangement makes it possible to efficiently administrate the data related to each of the stores 202.

While the preferred embodiments of this invention have been described in detail by reference to the accompanying drawings, it is to be understood that the invention may be embodied with various other changes, modifications and improvements, which may occur to those skilled in the art, without departing from the spirit and scope of the invention defined in the appended claims.

For example, in the first embodiment, the reflected waves generated by the respective transponders 3a-3c in response to the interrogating wave transmitted from each of the interrogators 2a-2e may have respective frequency bands different from one another. In this case, the above-described second difference value corresponds to a difference between the frequency of the interrogating wave and a most distant frequency which is the most distant from the frequency of the interrogating wave among the different frequency bands. The most distant frequency is determined such that the above-described expressions (1), (2) are satisfied.

While the modulation of the communication wave is effected by orthogonal frequency division multiplexing (OFDM) system in the first embodiment, it may be effected by any other modulation system such as FM (FSK) and spectrum diffusion communication (frequency hopping system), as long as the frequencies of the communication, interrogating and reflected waves cooperate to satisfy limitations related to the frequencies and recited in the appended claims. Further, the relationships among the frequencies fca, fcb, fcc, fcd, fcd, fce, minimum carrier frequency fs1, maximum carrier frequency fsn, minimum hopping frequency fl and maximum hopping frequency fh do not have to be limited to the details as described above, as long as they satisfy the frequency-related limitations recited in the appended claims.

In view of the fact that a communication system commonly includes a large number of transponders which are movable rather than stationary, the frequency of the transmission data signal emitted from each interrogator is higher than that of the response data signal emitted from each transponder, for reducing an amount of electric energy consumed by each transponder and simplifying a circuit provided in each transponder. In the second embodiment, the frequency of the transmission data signal is made higher than that of the response data signal, by tuning the interrogator. However, the frequency of the transmission data signal may be made higher than that of the response data signal, or the frequency of the response data signal may be made lower than that of the transmission data signal, by tuning the transponder rather than tuning the interrogator. This arrangement is advantageous where the transponder is newly installed in a backscatter system which has been already in operation, because the operation of the system can be resumed, by simply tuning the newly installed transponder, without changing the setting of each interrogator.

While the transmission wave filter 165 is arranged to pass the main carrier wave 192a and the upper sideband 192b of the transmission-data-signal modulated wave in the third embodiment, it may be modified to pass the main carrier wave 192a and the lower sideband 192c. In this case, each of the received wave filters 169, 173 is also modified to change its passage range.

While the response data signal is outputted at the randomly selected time slot, the subcarrier oscillator 152b may be adapted to oscillate the subcarrier at a frequency changed in accordance with a predetermined diffusion signal in such a manner that assures the advantage of the invention.

While the communication system 201 of the fourth embodiment includes the plurality of sub-systems each of which is substantially identical with the communication system 1 of the first embodiment, each of the sub-systems of the communication system 210 may be constructed to substantially identical with the communication system 101 of the second embodiment or the communication system 101a of the third embodiment. In this case, the interrogator 102a (i.e., one of the interrogators 102 included in the communication system 101) or the interrogator 106a (i.e., one of the interrogators included in the communication system 101a) is connected to the administrative server 203 via the network 205, such that a data communication can be effected between the interrogator 102a or 106a and the administrative server 203.

In the fourth embodiment, the single administrative server 203 is connected to the plurality of the sub-systems via the network 205, so that all the data related to the communications effected in the respective sub-systems are collected or administrated by the single administrative server 203 in an unified manner. However, two or more administrative servers may be connected to the sub-systems, so that the data is collected or administrated in a multi-lateral manner.

What is claimed is:

1. A wireless communication system comprising:
a plurality of interrogators each operable to transmit an interrogating wave, with each interrogating wave having a mutually different frequency, for interrogating at least one transponder, and to transmit a communication wave for communicating with the other of said interrogators; and
said at least one transponder operable, upon reception of the interrogating wave transmitted from each of said interrogators, to respond to said each of said interrogators with a reflected wave which is generated by modulating the interrogating wave;
frequency bands of the communication wave transmitted from one interrogator to other of said interrogators lying on respective opposite sides of the frequency of the interrogating wave of the one interrogator among the plurality of interrogators, and the frequency of the communication wave of each interrogator being set such that a frequency band of a communication wave transmitted from one of two interrogators having adjacent frequencies to the other of the two interrogators, and a frequency band of the communication wave transmitted from the other of the two interrogators to the one interrogator, overlap,
wherein:
a frequency band of the reflected wave transmitted from said at least one transponder to said each of said interrogators is separated from a frequency band of the communication wave transmitted from said each of said interrogators to the other of said interrogators and a frequency band of the interrogating wave, and the frequency band of the reflected wave transmitted from said at least one transponder to said each of said interrogators is closer to a frequency band of the interrogating wave transmitted from said each of said interrogators to said at least one transponder than the frequency band of the communication wave;

each of said interrogators is operable to communicate with the other of said interrogators in a wireless manner, one of upper and lower limit values defining the frequency band of the communication wave transmitted from said each of said interrogators is closer to the frequency of the interrogating wave transmitted from said each of said interrogators than the other of the upper and lower limit values and the one of upper and lower limit values that is closer to the frequency of the interrogating wave defining the frequency band of the communication wave transmitted from said each of said interrogators is different from the frequency of the interrogating wave transmitted from said each of said interrogators, by a first difference value, one of upper and lower limit values defining the frequency band of the reflected wave transmitted to respond to said each of said interrogators is more distant from the frequency of the interrogating wave transmitted from said each of said interrogators than the other of the upper and lower limit values and the one of upper and lower limit values that is more distant from the frequency of the interrogating wave defining the frequency band of the reflected wave transmitted to respond to said each of said interrogators is different from the frequency of the interrogating wave transmitted from said each of said interrogators, by a second difference value, and the first difference value is at least substantially twice as large as the second difference value.

2. The communication system according to claim 1, wherein one of upper and lower limit values defining the frequency band of the reflected wave transmitted to respond to said each of said interrogators is more distant from the frequency of the interrogating wave transmitted from said each of said interrogators, than the other of the upper and lower limit values, and is different from the frequency of the interrogating wave transmitted from said each of said interrogators, by a second difference value, wherein the frequency of the interrogating wave transmitted from said each of said interrogators is different from the frequency of the interrogating wave transmitted from one of said interrogators that is adjacent to said each of said interrogators, by a third difference value, wherein upper and lower limit values defining the frequency band of the communication wave transmitted from said each of said interrogators are different from each other by a fourth difference value, and wherein the third difference value is substantially equal to or larger than a sum of the fourth difference value and four times of the second difference value.

3. The communication system according to claim 1, wherein each of said interrogators is operable to transmit the interrogating wave for interrogating said at least one transponder, and to transmit communication waves having identical information, for communicating with at least two of said interrogators which are adjacent to said each of said interrogators, and wherein frequency bands of the respective communication waves transmitted by said each of said interrogators lie on opposite sides of a frequency of the interrogating wave transmitted by said each of said interrogators.

4. The communication system according to claim 1, wherein each of said interrogators is operable to transmit a communication wave for communicating with the other of said interrogators, and wherein the communication wave is a wave modulated by an orthogonal frequency division multiplexing (OFDM) system.

5. The communication system according to claim 4, wherein each of said interrogators includes:

an OFDM signal generator operable to generate an OFDM signal;

a mixer operable to obtain the communication wave, by upconverting the generated OFDM signal with a main carrier wave;

a combiner operable to obtain a transmitting wave, by combining the obtained communication wave with the interrogating wave constituted by the main carrier wave which is modulated or not modulated;

a detector operable to detect a received wave which has been received by said each of said interrogators;

an A/D converter operable to convert the detected wave into a digital signal;

a separator operable to separate the detected wave which has been converted into the digital signal, into a component of the reflected wave and a component of the communication wave which has been transmitted from the other of said interrogators;

a reflected-wave demodulator operable to demodulate the component of the reflected wave which has been separated from the component of the communication wave; and a communication-wave demodulator operable to demodulate the component of the communication wave which has been separated from the component of the reflected wave.

6. The communication system according to claim 5, wherein each of said interrogators further includes a Fourier transformer, and wherein said reflected-wave demodulator and said communication-wave demodulator share said Fourier transformer with each other.

7. An interrogator for use in the communication system defined in claim 1.

8. An interrogator providing each of a plurality of interrogators which cooperate with at least one transponder to constitute a wireless communication system, in which each of said interrogators is operable to transmit a main carrier wave to the transponder and to transmit a communication wave to the other of said interrogators in a wireless manner, while the transponder is operable, upon receipt of the main carrier-wave transmitted from said each of said interrogators, to respond with a reflected wave generated by modulating the main carrier wave with a response data signal, said interrogator comprising:

a transmission data signal generator operable to generate a transmission data signal based on information that is to be transmitted to the other of said interrogators, such that a frequency band of the generated transmission data signal is different from a frequency band of the response data signal, which is different from a frequency band of the main carrier wave;

a main carrier modulator operable to generate a transmission-data-signal modulated wave, by modulating the main carrier wave transmitted from the interrogator to the responder with the transmission data signal which has been supplied from said transmission data signal generator;

a transmitter operable to transmit the communication wave containing the main carrier wave and the transmission-data-signal modulated wave which have been supplied from said main carrier modulator;
the plurality of interrogators transmitting interrogating waves each having a mutually different frequency;
a receiver operable to receive the reflected wave which has been transmitted from the transponder, and to receive the communication wave which has been transmitted from the other of said interrogators in the wireless manner,
frequency bands of the communication wave transmitted from one interrogator to other of said interrogators lying on respective opposite sides of the frequency of the interrogating wave of the one interrogator among the plurality of interrogators transmitting the interrogating waves each having a mutually different frequency, and the frequency of the communication wave of each interrogator being set such that a frequency band of a communication wave transmitted from one of two interrogators having adjacent frequencies to the other of the two interrogators, and a frequency band of the communication wave transmitted from the other of the two interrogators to the one interrogator, overlap;
wherein:
one of upper and lower limit values defining the frequency band of the communication wave transmitted from said each of said interrogators is closer to the frequency of the interrogating wave transmitted from said each of said interrogators than the other of the upper and lower limit values and the one of upper and lower limit values that is closer to the frequency of the interrogating wave defining the frequency band of the communication wave transmitted from said each of said interrogators is different from the frequency of the interrogating wave transmitted from said each of said interrogators, by a first difference value,
one of upper and lower limit values defining the frequency band of the reflected wave transmitted to respond to said each of said interrogators is more distant from the frequency of the interrogating wave transmitted from said each of said interrogators than the other of the upper and lower limit values and the one of upper and lower limit values that is more distant from the frequency of the interrogating wave defining the frequency band of the reflected wave transmitted to respond to said each of said interrogators is different from the frequency of the interrogating wave transmitted from said each of said interrogators, by a second difference value, and
the first difference value is at least substantially twice as large as the second difference value.

9. The interrogator according to claim 8, wherein said transmission data signal generator generates the transmission data signal such that a frequency of the transmission data signal is higher than a frequency of the response data signal.

10. The interrogator according to claim 8, further comprising:
a received wave demodulator operable to demodulate the waves which have been received by said receiver, with an output supplied from said main carrier modulator;
a first filter operable to pass the response data signal among an output supplied from the received wave demodulator; and
a second filter operable to pass the transmission data signal among the output supplied from the received wave demodulator.

11. A transponder providing each of at least one transponder which cooperates with a plurality of interrogators each provided by the interrogator defined in claim 8, to constitute a communication system, said transponder comprising:
a response data signal generator operable to generate a response data signal based on information that is to be transmitted to the interrogators, such that a frequency band of the generated response data signal is different from the frequency band of the transmission data signal; and
a main carrier reflector operable to modulate the main carrier wave transmitted from each of the interrogators, with the generated response data signal, and to respond to said each of the interrogators with a reflected wave which is provided by the modulated main carrier wave,
wherein said response data signal generator generates the response data signal such that a frequency band of the response data signal is lower than a frequency band of the transmission data signal.

12. An interrogator providing each of a plurality of interrogators which cooperate with at least one transponder to constitute a wireless communication system, in which each of said interrogators is operable to transmit a main carrier wave to the transponder and to transmit a communication wave to the other of said interrogators in a wireless manner, while the transponder is operable, upon receipt of the main carrier wave transmitted from said each of said interrogators, to respond with a reflected wave generated by modulating the main carrier wave with a response data signal, said interrogator comprising:
a transmission data signal generator operable to generate a transmission data signal based on information that is to be transmitted to the other of said interrogators;
a main carrier modulator operable to generate a transmission-data-signal modulated wave, by modulating the main carrier wave with the transmission data signal which has been supplied from said transmission data signal generator, and to output the main carrier and the generated transmission-data-signal modulated wave having components whose respective frequency bands lie on opposite sides of a frequency of the main carrier wave;
a filter operable to pass, among an output supplied from the main carrier modulator, the main carrier wave and one of the components of the transmission-data-signal modulated wave, and to reject the other of the components of the transmission-data-signal modulated wave;
a transmitter operable to transmit the communication wave containing the main carrier wave and the one of the components of the generated modulated wave, which have been supplied from said filter;
the plurality of interrogators transmitting interrogating waves each having mutually different frequencies;
a receiver operable to receive the reflected wave which has been transmitted from the transponder, and to receive the communication wave which has been transmitted from the other of said interrogators in the wireless manner,
frequency bands of the communication wave transmitted from one interrogator to other of said interrogators lying on respective opposite sides of the frequency of the interrogating wave of the one interrogator among the plurality of interrogators transmitting the interrogating waves each having a mutually different frequency, and the frequency of the communication wave of each interrogator being set such that a frequency band of a communication wave transmitted from one of two interrogators having adjacent frequencies to the other of the two interrogators, and a frequency band of the communication wave transmitted from the other of the two interrogators to the one interrogator, overlap.

wherein:
one of upper and lower limit values defining the frequency band of the communication wave transmitted from said each of said interrogators is closer to the frequency of the interrogating wave transmitted from said each of said interrogators than the other of the upper and lower limit values and the one of upper and lower limit values that is closer to the frequency of the interrogating wave defining the frequency band of the communication wave transmitted from said each of said interrogators is different from the frequency of the interrogating wave transmitted from said each of said interrogators, by a first difference value, one of upper and lower limit values defining the frequency band of the reflected wave transmitted to respond to said each of said interrogators is more distant from the frequency of the interrogating wave transmitted from said each of said interrogators than the other of the upper and lower limit values and the one of upper and lower limit values that is more distant from the frequency of the interrogating wave defining the frequency band of the reflected wave transmitted to respond to said each of said interrogators is different from the frequency of the interrogating wave transmitted from said each of said interrogators, by a second difference value, and the first difference value is at least substantially twice as large as the second difference value.

13. The interrogator according to claim 12, further comprising:
a first reception filter operable to pass, among the waves received by said receiver, the reflected wave which has been transmitted from the transponder; and
a second reception filter operable to pass, among the waves received by said receiver, the communication wave which has been transmitted from the other of said interrogators.

14. The interrogator according to claim 12, further comprising a main carrier generator operable to generate the main carrier wave such that the main carrier wave has such an intensity that prevents the reflected wave transmitted from the transponder, from interfering with the communication wave transmitted from the other of said interrogators.

15. The interrogator according to claim 8, further comprising a communication wave reception determiner operable to determine whether the communication wave transmitted from the other of said interrogators is being received by said receiver or not,
wherein said transmitter suspends transmission of the communication wave to the other of said interrogators while said communication wave reception determiner determines that the communication wave transmitted from the other of said interrogators is being received by said receiver.

16. The communication system according to claim 1, further comprising an administrative server,
wherein at least one of said interrogators is connected to said administrative server via a communication line, such that a data communication can be effected between said at least one of said interrogators and the administrative server.

17. The communication system according to claim 16,
wherein each of said at least one of said interrogators connected to said administrative server includes a communication data transmitter operable to transmit data related to communication between said interrogators and data related to communication between each of said interrogators and said transponder, to said administrative server via said communication line,
and wherein said administrative server includes a communication data administration portion operable to administrate, in a unified manner, a set of data transmitted from said at least one of said interrogators.

18. The communication system according to claim 16, wherein each of said at least one of said interrogators connected to said administrative server includes: (i) a communication data collector operable to collect data related to communication between said interrogators and data related to communication between each of said interrogators and said transponder, by sequentially interrogating the other of said interrogators adjacent to said each of said at least one of said interrogators; and (ii) a communication data transmitter operable to transmit a set of data collected by said communication data collector, to said administrative server via said communication line.

19. The communication system according to claim 17, wherein said interrogators are placed in each of a plurality of stores, and wherein the set of data transmitted from said at least one of said interrogators include data related to each of the plurality of stores in which interrogators are placed.

* * * * *